US005790789A

United States Patent [19]
Suarez

[11] Patent Number: 5,790,789
[45] Date of Patent: Aug. 4, 1998

[54] METHOD AND ARCHITECTURE FOR THE CREATION, CONTROL AND DEPLOYMENT OF SERVICES WITHIN A DISTRIBUTED COMPUTER ENVIRONMENT

[76] Inventor: Larry Suarez, 240 Hillcrest Ct., Pleasant Hill, Calif. 94523

[21] Appl. No.: 691,567

[22] Filed: Aug. 2, 1996

[51] Int. Cl.⁶ ............................................ G06F 13/00
[52] U.S. Cl. ................................. 395/200.32; 395/680
[58] Field of Search ........................... 395/200.3, 200.31, 395/200.32, 200.33, 200.5, 200.53, 200.54, 200.55, 200.59, 610, 670, 671, 672, 684, 685, 680

[56] References Cited

U.S. PATENT DOCUMENTS

| | | | |
|---|---|---|---|
| 4,356,546 | 10/1982 | Whiteside et al. | 395/182.08 |
| 4,630,196 | 12/1986 | Bednar et al. | 395/200.32 |
| 4,839,798 | 6/1989 | Eguchi et al. | |
| 4,866,707 | 9/1989 | Marshall et al. | 370/216 |
| 4,888,800 | 12/1989 | Marshall et al. | 380/21 |
| 5,031,089 | 7/1991 | Liu et al. | 395/200.56 |
| 5,073,852 | 12/1991 | Siegel et al. | 395/680 |
| 5,124,909 | 6/1992 | Blakely et al. | 395/200.33 |
| 5,133,053 | 7/1992 | Johnson et al. | 395/200.53 |
| 5,142,683 | 8/1992 | Burkhardt, Jr. et al. | 395/200.45 |
| 5,167,035 | 11/1992 | Mann et al. | 395/182.02 |
| 5,212,790 | 5/1993 | Ohler et al. | 395/701 |
| 5,216,603 | 6/1993 | Flores et al. | 704/1 |
| 5,230,051 | 7/1993 | Quan | 395/680 |
| 5,257,369 | 10/1993 | Skeen et al. | 395/680 |
| 5,301,320 | 4/1994 | McAtee et al. | 705/9 |
| 5,317,688 | 5/1994 | Watson et al. | 345/337 |
| 5,329,626 | 7/1994 | Klein et al. | 395/200.78 |
| 5,367,635 | 11/1994 | Bauer et al. | 395/200.51 |
| 5,367,681 | 11/1994 | Foss et al. | 395/683 |
| 5,369,765 | 11/1994 | Collet | 395/701 |
| 5,386,568 | 1/1995 | Wold et al. | 395/710 |
| 5,408,619 | 4/1995 | Oran | 395/280 |
| 5,421,013 | 5/1995 | Smith | 395/677 |
| 5,444,851 | 8/1995 | Woest | 395/200.52 |
| 5,457,797 | 10/1995 | Butterworth et al. | 395/682 |
| 5,499,364 | 3/1996 | Klein et al. | 395/200.32 |
| 5,638,494 | 6/1997 | Pinard et al. | 395/200.32 |
| 5,682,482 | 10/1997 | Burt et al. | 705/42 |
| 5,689,700 | 11/1997 | Miller et al. | 707/10 |

*Primary Examiner*—Moustafa M. Meky
*Attorney, Agent, or Firm*—Fitch, Even, Tabin & Flannery

[57] ABSTRACT

A distributed computing system comprising a plurality of computer hosts, a communication network for exchanging information and data between the computer hosts, and a plurality of services, including software-based services, distributed throughout the computing system is disclosed. Each of the services within the present distributed computing system, including some basic system-services are adapted to perform prescribed functions in response to the receipt of an electronic message. The disclosed distributed computing system also includes a plurality of intelligent agents executing on the computer hosts and associated with one or more of the services, wherein an agent exercises control of an associated service by manipulating the electronic messages directed to and originating from the associated service. In addition, the services are adapted to cooperatively perform various tasks by exchanging electronic messages across the communication network via their associated agents.

30 Claims, 15 Drawing Sheets

Microfiche Appendix Included
(1 Microfiche, 68 Pages)

METHOD AND ARCHITECTURE FOR THE CREATION, CONTROL AND DEPLOYMENT OF SERVICES WITHIN A DISTRIBUTED COMPUTER ENVIRONMENT

A portion of the disclosure of this patent document contains material that is subject to copyright protection. The copyright owner has no objection to the facsimile reproduction by anyone of the patent document or the patent disclosure, as it appears in the U.S. Patent and Trademark Office patent files or record, but otherwise reserves all copyright rights whatsoever.

A microfiche appendix, designated as Appendix F consisting of one microfiche and of 68 frames is included as a part of the specification. All material therein is subject to copyright protection as indicated above.

FIELD OF THE INVENTION

The present invention relates to a distributed computing system utilizing intelligent agents within a service-based computing environment, and more particularly, to a method and architecture for the creation, control and deployment of services within a distributing computer environment.

BACKGROUND OF THE INVENTION

To aid in the understanding of the prior art and the problems associated therewith, it may be helpful to provide a brief overview of distributed computing environments. As used herein, a computing environment consists of a plurality of computers connected by a network which allows the computers to communicate and pass information and/or data between themselves. The network may range from a local environment, such as a local area network (LAN), to a very large and expansive network, such as a wide area networks (WAN), and many other distributed network systems. The computer environment also includes the various operating systems, storage mediums, and other processing resources which reside on these computers and that are interconnected and accessible via the network through various software products.

Further, a collection of information service systems and application systems generally embodied within software products, are also considered to be part of the computing environment. The information service systems and application systems used within any given computing environment range from commercially available software applications (e.g. spreadsheets, wordprocessors, databases) to custom developed software products tailored for a specific use within a designated computing environment.

Participants (i.e. companies, organizations, groups or individuals) can also be viewed as part of the computing environment. Generally, there are multiple types of participants associated with a distributed computing environment including application users, application developers, and system administrators. Within a distributed computing environment, the many different participants typically require access to a number of different application systems concurrently which requires the sharing of computer resources.

A dominant architecture that is receiving widespread use in many current distributed computing environments is known as the client-server architecture. Client-server architecture is a hierarchical architecture for distributed computing environments that is generally divided into two layers. One layer within the client-server architecture includes most of the application systems. Application systems include fourth generation languages, computer aided software engineering tools, programming languages and their support tools, and various other commercially available software products. This first layer typically represents the client layer.

A second layer within the client-server architecture includes most of the information service systems. The information service systems are software products such as database management systems and data repositories, specialized data access methods, application servers, and any number of service based monolithic software systems. This second layer represents the server layer.

Recent innovations to the client-server architecture include the introduction of a third or middle layer. This third layer typically includes software products designed to provide various infrastructure or interfacing services between other components of the distributed computing environment such as between an application system and an information service system. Such software products are classified as middleware products or systems. A recent term for the hierarchical architecture that utilizes middleware systems is a three-tier system or multi-tier system architecture, where the middleware system consists of software products, applications and services that had previously existed either in the client layer or server layer. Three-tier or multi-tier layers are well known in the art.

Another increasingly popular distributed computing environment architecture is the peer-to-peer architecture. A peer-to-peer architecture provide any number of peers or service providers while removing some of the constraints imposed by a traditional client-server or other hierarchical architecture. Within a peer-to-peer system architecture, each peer provides one or more services and is able to cooperate and collaborate with fellow peers as services need to be performed concurrently or sequentially.

An inherent limitation in many client-server architecture systems is that as the size of various application systems become larger, more encompassing, more complex, and use more computing resources, the performance of the entire computing environment suffers. Monolithic systems or single software packages operating across different tiers or among various peers are rapidly becoming unable to support complex tasks because the shear size of software (i.e. total number of lines of code) necessary to run the system and the lack of necessary features. Moreover, it is readily apparent that many participants are transitioning toward desktop computing environments with an increasing number of individual users. It is often difficult, if not impossible, for large information service system or application systems to run on a single desktop computer host because of the large usage of computing resources such as memory and disk space. In addition, because application systems and information service systems are being accessed by a large number of participants, numerous contention problems and priority problems arise which in turn affects the perceived performance of the overall system. Another problem with many conventional client-server architecture systems is that they are not designed to be inherently fault-tolerant. For example, unless the computing system is designed with complete redundancy, all participants are typically affected if the server becomes unavailable due to a system failure.

The related art has addressed the problem of application systems becoming too large through the partitioning of applications as taught, for example, in the U.S. Pat. No. 5,457,797 (Butterworth), and U.S. Pat. No. 5,212,790 (Ohler). While these U.S. patents by no means represent the only form of partitioning schemes available for large applications and application systems, they are generally representative of the conventional concept of partitioning a software base application.

Specifically, U.S. Pat. No. 5,457,797 (Butterworth) discloses a method of partitioning an application program into a plurality of objects, with selected objects being capable of executing on a different classes of computer. Disadvantageously, the partitions of an application system into such objects as disclosed in U.S. Pat. No. 5,457,797 and many other related art references are comprised of only software modules. Thus, such partitioning schemes are limited in their use to software applications only. However, as described below, advanced applications systems are involving not only conventional software applications, but also individuals, software fragments that are under the control of vendor systems such as database systems storage procedures, and even physical components such as medical monitoring devices, office equipment and the like. Furthermore, most of the related art partitioning schemes typically impose a number of rules or artificial constraints in the variation of partitions.

Several other examples of related art partitioning schemes include those schemes disclosed in U.S. Pat. Nos. 5,386,568 (Wold), 5,369,765 (Collete), and 5,257,369 (Skeen). These related art references teach techniques for partitioning software modules in very specific manners. Again, the partitioning schemes disclosed within these other examples of related art references, are limited in that they can only be used with conventional software based applications or application systems and are not suitable for use with advance or next generation application systems that include both software and other application technologies.

As application systems and information service systems are requested to accomplish more difficult tasks, the assumption that a single monolithic application must carry the burden of those tasks is too much to ask. Large software applications and large repositories of data, even when partitioned, are expensive to develop, test and maintain. It is much simpler and more cost effective to develop a autonomous, small software components of an application and allow those small components to communicate with one another to complete a large task and to standardize the information resulting from that task. Smaller cohesive services such as these are easier to develop, test, use and maintain than their large counterparts. Thus, there is an increasing move away from data driven solutions using large software applications toward process driven solutions using a collection of smaller cohesive services. For good reason, the conventional client-server architecture typically includes various applications in the client layer while the data repositories and data management systems typically reside in the server layer. It is believed that the next generation of applications will still need to access this data, however, it will be predominantly involve process driven solutions where pieces of applications or services cooperate to complete complex tasks.

Another common problem existing in client-server architecture systems and some existing peer-to-peer architecture systems is that users are finding themselves with a number of distinct application systems and information service systems resulting from the adoption of technology at different paces by participants, consolidation of multiple participants through company mergers, or the need of participants to cooperate and collaborate. Many client-server architecture systems do not adequately support the integration of numerous existing application systems. Rather, client-server architecture systems and existing peer-to-peer architecture systems typically require migration to a set of uniform application systems to make efficient use of the information service systems. Such migration often sacrifices performance of some aspects of the computing system and further creates a general reluctance on the part of participants to adopt new technology.

The reluctance to adopt new technology and make improvements to existing application systems results in a the existence of legacy applications (i.e. earlier revisions of established software products). These legacy applications represent a major obstacle in the evolution of the information industry. Moreover, there is a reluctance on the part of system administrators to evolve their computing environments to utilize current language systems, preferring to remain with systems in which most existing users and developers are comfortable. Accordingly, any new distributed computing environment must address the continuing need of users and developers to access and support legacy applications many of which will never migrate to new and current language systems.

Even where migration is a feasible alternative, the migration will preferably be towards an open computing environment. It is presently unrealistic and unreasonable to require the development of new software based applications or services in a proprietary language or proprietary system. System administrators typically prefer to maintain a flexible and open environment to avoid developing what may one day be considered a legacy application. Moreover, avoiding proprietary languages and proprietary systems in the development of software-based services makes economic sense in that there are many different software and hardware vendors competing within the information industry, which tends to lower the cost associated with the development, operation, and maintenance of the computing environment.

Another trend that is becoming readily apparent within the information industry is that many new application systems are not merely a piece of software executing in a computer environment. Application systems can and do entail a number of various technologies and various computer resources to be effective. The next generation of applications consist of distributed services that are able to cooperate and collaborate to accomplish complex tasks. These advanced application systems merely require users or other participants to describe relationships between services through a set of business rules and/or classic workflow features.

Another requirement of many present application systems operating in a distributed computer environment is a need to provide fault tolerant capabilities. Fault tolerant capabilities include the ability for an application and/or computing environment to be up and operating seven days a week, 24 hours per day and to eliminate single-point-of-failure nodes (i.e. nodes of a computing environment or application system which when unavailable affect the entire system or make the entire system unavailable).

Yet another important requirement of many present application systems operating within a distributed computing environment is scaleability. Scaleability is the ability of an application system and information service system to address computer environments that range from small (i.e., small numbers of users and computers) to very large computing environments (i.e., large numbers of users and computers) without the significant loss of efficiency. There is a growing demand for a distributed computing system architecture to incorporate such advantageous features as scaleability, fault-tolerance, support of legacy applications, and other features such as modeling and simulation capabilities, etc., without significantly contributing to the complexity of the computing environment and without significantly sacrificing performance of the distributed computing system.

In addition, advanced applications which incorporate various other technologies and data processing resources such as facsimile machines, document scanners, bar code readers, magnetic card readers are commonplace. Assimilating the various application technologies and computing resources into a distributed computing environment currently requires a vast amount of dedicated resources which in turn sacrifices performance and/or efficiency of the distributed computing environment. With this in mind, there is a need for a distributed computing system architecture that readily supports the addition and incorporation of such technological features without requiring an excessively large amount of dedicated resources and which does not adversely affect the performance or efficiency of other aspects of the system.

An alternative technique aimed at addressing some of the aforementioned problems arising in distributed computing environments is the application of agent technology. The notion of agents and agent technology has existed for some time in the information industry, however, there does not exist a standard definition of what an agent entails. A common perception of an agent is a software module or process that accomplishes a task, typically on behalf of a user. For example, conventional agents can filter electronic mail messages for a user based on a specific criteria to reduce the number of junk mail that a user receives. Related art disclosures, such as U.S. Pat. Nos. 5,421,013 (Smith) and 5,367,635 (Bauer) reflect the more conventional concept of an agent. However, these disclosures make little distinction, if any, between a standard software process and agents. See also U.S. Pat. No. 5,317,688 (Watson) which discloses a representation of the software-based agent whose behavior is relatively dynamic and changing as it receives instructions during execution.

Disadvantageously, the more an agent looks and functions as a customized software process, the less likely that agents will be able to cooperate with other customized agents operating within the distributed computer environment. Many of the related art agents, both static and dynamic, operating within a distributed computing environment inevitably demonstrate different behaviors and characteristics. However, because these different agents often need to cooperate with one another within the distributed computing environment to accomplish various tasks, there is a need to facilitate communication between different agents. This is especially true where the agents are associated with different application systems or services. To that end, there is a need to provide a universal or generic architecture for agents which facilitates the cooperative behavior of agents associated with different applications or services. The architecture of an agent based computing system should be independent of the environment in which it exists and independent of the application system or service which it supports.

There exist several related art middleware products that address some of the aforementioned needs. These products are primarily transaction processing monitors, messaging products, and distributed processing infrastructures. Disadvantageously, many middleware products require the acceptance of the object oriented paradigm and require the use of proprietary languages to build distributed services. Problems associated with the object oriented paradigm include the tendency for objects and their methods to be too fine grained in that they are highly focused code fragments that are relatively small in size. Distributing, invoking and maintaining fine grained methods in a network environment is expensive and difficult to administer. Conversely, the present invention is a non-proprietary based system that encourages the development of relatively, coarse services in order to reduce network traffic, reduce distribution complexities, and support alternative language systems other than object oriented systems.

SUMMARY OF THE INVENTION

The present invention satisfies the above and other needs by providing a distributed computing system comprising a plurality of computer hosts, a communication network for exchanging information and data between the computer hosts, and a plurality of services associated with the computer hosts and distributed throughout the computing system. Each of the services within the present distributed computing system are adapted to perform a prescribed function in response to the receipt of an electronic message. The present distributed computing system also includes a plurality of agents executing on the computer hosts and associated with one or more of the services, wherein an agent exercises control of an associated service by manipulating the electronic messages directed to and originating from the associated service. In addition, the services are adapted to cooperatively perform various tasks by exchanging electronic messages across the communication network via their associated agents.

The present invention takes a specialized and non-process oriented approach to agents in that an agent is assigned specifically to control services and to service behavior. In other words, an agent within the present invention, is not a static software implemented process but rather a dynamic means for controlling the services. The behavior of the agent in controlling a service is dynamic in that the agent's behavior toward a service changes over time. This dynamic behavior is an important feature of the present system which allows individual agents throughout the distributed computing environment to react to a changing computing environment.

Accordingly, one feature of the present invention is to provide a computing system that does not require the use of proprietary development language to build application services. Developers may construct service based systems that contain services that are built for a number of different vendor application development products. This feature allows an organization to leverage off both its existing development products and existing developer skills.

Another feature of the present invention is that the impact of employing a service based system is minimal on an existing computing environment, both in terms of computing resources and computing hardware requirements. The present invention is designed to support a migrating approach to moving existing computing systems toward the present architecture.

It is yet another feature of the present invention to support the distribution of services to other computing environments. Users are able to control the environment as to where the services execute, how long the service is used and access privileges to particular services.

Another aspect of the present invention is that it facilitates the use of advanced Agent technology. Advanced Agent technology allows users to intelligently control the overall behavior of the agents and its corresponding services. Users can control how, when, and where prescribed services execute. In addition, advanced capabilities such as method manipulations, security enforcement and transactional behavior can be governed by the agent.

The present invention also maintains information about computing resources that exist within a particular computing environment. Users can take advantage of existing computer resources to execute services. For example, host computers that have large computing resources such as disk space and memory can be used by services that are computing intensive, alternately saving the users host computer from being inundated with costly services. Another feature of the present invention is that it supports access and control of legacy applications.

The present invention can initiate legacy applications, including passing parameter data and other information to the application. Users can later migrate a legacy application to take full advantage of the present architecture or continue the user legacy application as it exists. This feature allows the invention to be introduced within an organization with little infusion costs and little interference with existing applications. Yet another feature of the present invention is that it is uniquely architecture so that only a minimum number of services are required to reside on any particular computer host. The remaining services can reside anywhere on the network where they are used more efficiently. This permits the invention to run on systems ranging from small laptops to large computer systems and mainframes. Users may already be using products and support services already provided by the present invention and would rather take advantage of their current investment. Users will be able to replace existing services with either their own services or competing services from other vendors.

BRIEF DESCRIPTION OF THE DRAWINGS

The above and other aspects, features and advantages of the present invention will be more apparent from the following, more descriptive description thereof, presented in conjunction with the following drawings, wherein.

Figure 1:
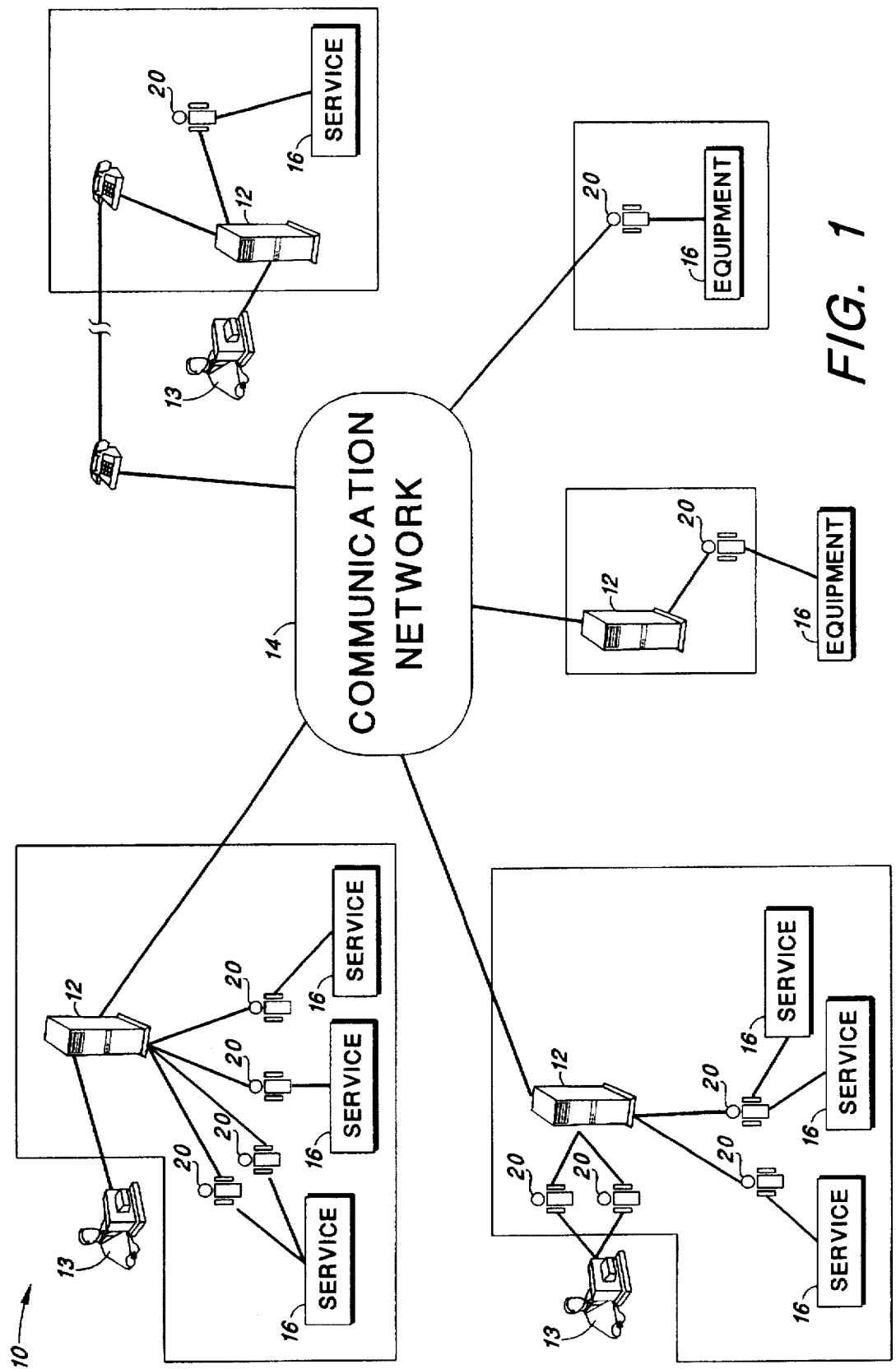
FIG. 1 illustrates the general architecture of a competing environment incorporating the present invention showing the relationship between agents, services, computer hosts distributed across a computer network.

Appendix F is a microfiche Appendix containing a computer listing of the system schema, the service library, and some portable definitions and structures used within the described embodiment of the distributed computing system;

DETAILED DESCRIPTION OF THE PREFERRED EMBODIMENT

The following description is of the best mode presently contemplated for carrying out the invention. This description is not to be taken in a limiting sense, but is made merely for the purpose of describing the general principles of the invention. The scope of the invention should be determined with reference to the claims.

Before describing the details associated with the present invention, it may be helpful to provide a general overview of the present invention coupled with an explanation of several terms used to describe the present invention.

The present invention can be characterized as a message based system operating within a distributed computing environment which supports the communication between services to accomplish tasks. A message is a formatted string of data or information that travels through the distributed computing environment. Within the present system, messages have a well-defined format to convey information. A message consists of a collection of attribute-value pairs. Each attribute-value pair consists of the name of the attribute, the data type of the attribute, the length of the attribute, security aspects of the attribute including who may access the attribute, and the value of the attribute.

The present invention, however, should not be mistaken for a system that only concerned with the communications aspect of a distributed application or distributed computing environment. Rather, the present invention is a complete system that affects all aspects of a distributed application including, communication, processing, reliability, efficiency, storage etc. The communication network supports the passing of information and data between the various computer hosts and other physical equipment. Each computer host includes an operating system, processing means for performing various services, storage means for the storage and retrieval of information, and a communication means for interfacing with other computer hosts and equipment via the communication network.

Generically speaking, a service is a unit of work. Services are typically embodied in software applications, electronic mail, application systems, software fragments or modules, macros, database procedures, physical actions of individuals, and operation of physical equipment. Some of the defined services provided within the computing environment are necessarily internal or system based services while many of the services provided within the computing environment are external or participant based services. Much like, related art software solutions partitioned large software applications into a series of smaller segments in accordance with a series of rules, the present system partitions the computing environment into a plurality of services yet does not impose any rules in such partitioning or derivation of services.

Agents are entities which provide and control the aforementioned services. Agents may or may not physically exist within the computing system as does a software process. Agents within the presently disclosed system are broadly classified as intelligent agents that provide both interconnectivity and services on behalf of a user or another agent with some degree of autonomy. In doing so, the agent assumes a dynamic behavior tailored to the service it provides, the process flows incorporated within the computing environment, the physical attributes of the computing environment into which it is incorporated, and specific tasks to be accomplished. Other characteristics of the agents, such as its' structure and functionality, however, are generally independent of the services they control. In this manner, the agents represent a standard architecture which facilitates cooperation and collaboration between agents associated with different hosts and various services. The services, on the other hand, are typically static. For example, services embodied within software applications or modules are mere compiled language code that change only upon modification of the source code and re-compilation. Agent behavior is preferably controlled by the environment in which it exists (virtually or physically) and does not require a scripting language to define the behavior. However, the use of interpretive scripting language to internally define agent behavior is contemplated.

Referring now to the drawings, FIG. 1 illustrates the general architecture of a computing environment incorporating the present invention 10. The illustrated computing environment includes such traditional elements such as computer hosts 12, users 13, and a communication network 14 but does so within an architecture that further includes a plurality of defined services 16, and a plurality of agents 20 adapted to dynamically control such services 16. The illustrated communication network 14 may be comprised of a local area network (LAN), wide area network (WAN), secure network, wireless communication network, satellite communication networks, direct internal connections with computer hosts, and any combination thereof.

Figure 2:
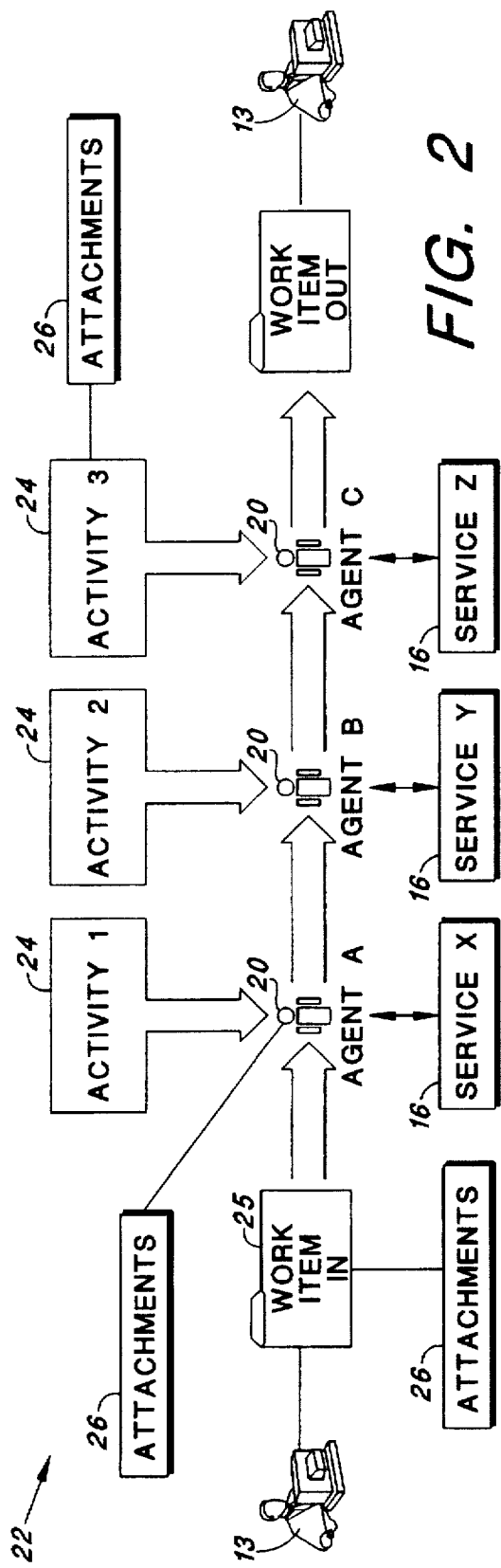
FIG. 2 illustrates a typical process flow and the relationship between activities and the agents and services assigned to an activity.

Referring to FIGS. 1 and 2, the illustrated computing environment, like related art computing environments, is adapted to facilitate the performance of prescribed tasks. Within the present computing environment, tasks may be accomplished in accordance with a series of well-defined processes that operate on various work items. As seen in FIG. 2, the illustrated process flow 22 is typically comprised of one or more activities 24 which are performed on a work item 25 in a prescribed sequence. It is through the communication of defined services 16 with one another that the various processes and process flows 22 are performed and tasks are accomplished. Associated with each process or process flow 22 is a variety of other information referred to as attachments 26. These attachments include information attributable to the overall process 22, individual agents, individual activities 24, and/or work item 25. A work item 25 is a collection of data that is flowing through the distributed system (e.g., forms, invoices, etc.) and is typically associated with specific processes defined by a participating organization. The attachments 26 may include information that is static as well as dynamic information generated by the process, modified by the process, or otherwise used within the process flow 22. A process flow 22 also typically involves or affects a plurality of users 13 and other participants and is typically adapted to operate on multiple work items concurrently.

Figure 3:
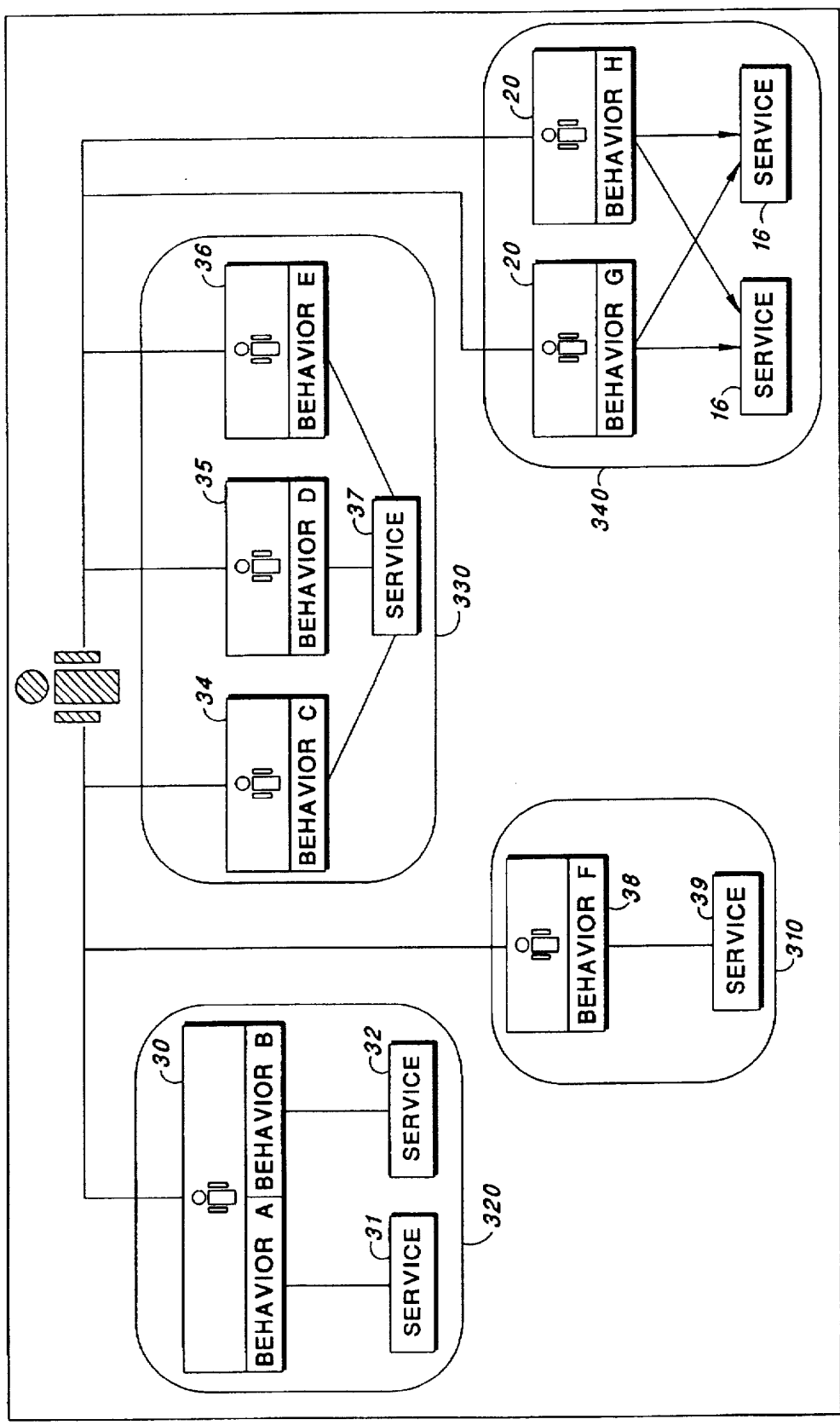
FIG. 3 illustrates the relationships that exist between agents and the services they provide.

FIG. 3 illustrates the general relationships between an agent and a service within the present system. An agent exists to provide a service and services are accessed only through agents. As seen therein, within a given computer host 12, the agent-service relationship can exist as a one-to-one relationship (block 310), a one-to-many relationship (block 320), a many-to-one relationship (block 330), or a many-to-many relationship (block 340). In other words, an agent may provide more than one service and a service 16 may be provided by more than one agent. Where an agent provides more than one service (block 320), the agent's behavior is dependent on the service it is providing. Some typical behaviors include monitoring the service, encrypting outgoing messages, etc. In FIG. 3, agent 30 is providing services 31 and 32. When providing service 31, agent 30 may need to duplicate all incoming and outgoing messages to a designated agent (behavior A), whereas when providing service 32, outgoing messages are encrypted (behavior B). Where a service is provided by more than one agent (block 330), each agent is said to have a different view of the service it provides. For example, each of the three agents 34, 35, 36 providing service 37 in FIG. 3 may exhibit a different behavior when providing service 37. For example, service 37 provided by agent 34 may only be available during regular business hours whereas the same service 37 when provided by agent 35 or agent 36 are available 24 hours a day. Block 310 of FIG. 3 also illustrates a one-to-one relationship between agent 38 and service 39.

Figure 4:
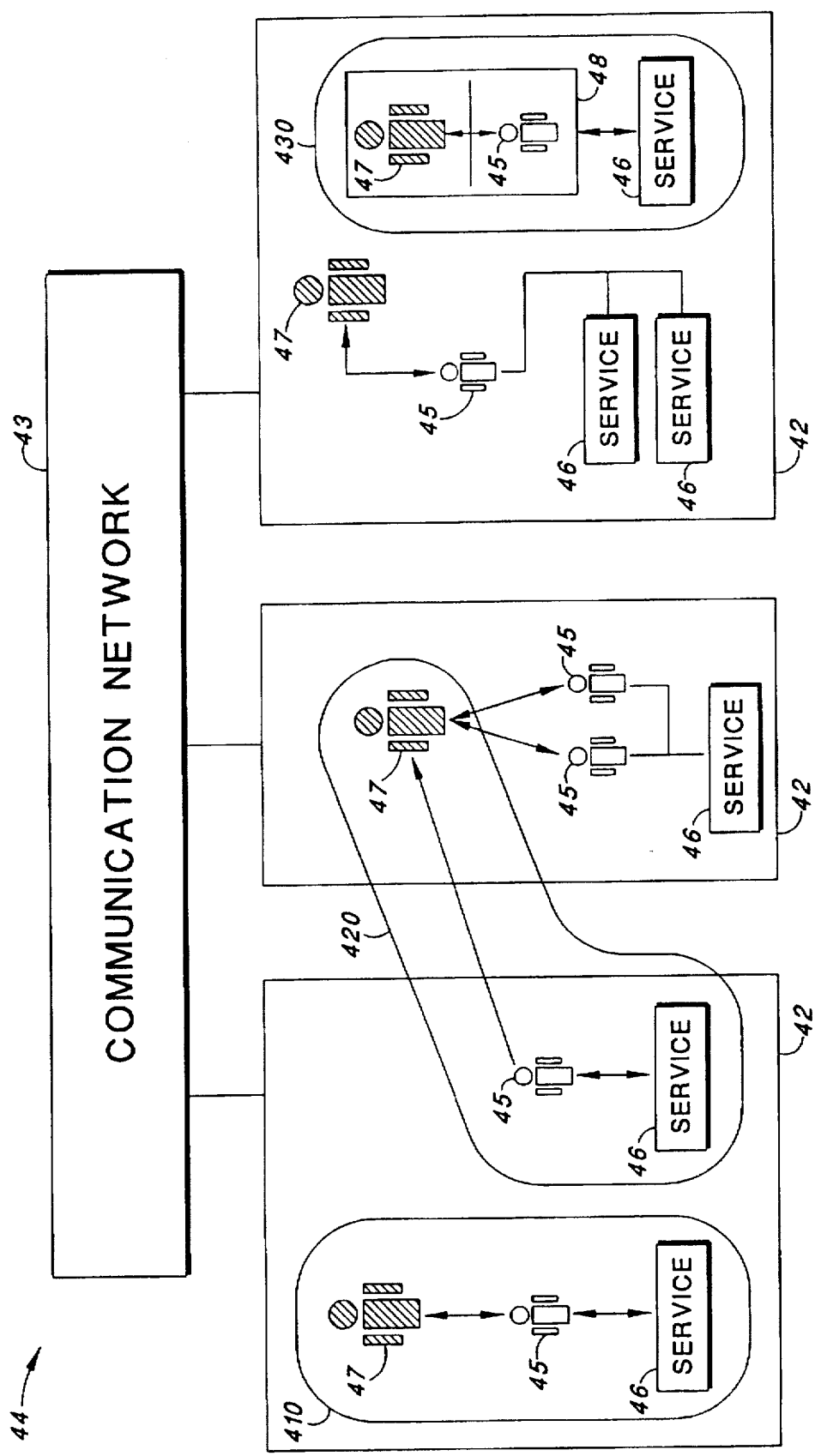
FIG. 4 is a more detailed representation of the general architecture of a computing environment incorporating the present invention showing the relationship between Bus Agents, agents, and services, within a distributed computing environment.

Referring now to FIG. 4, there is shown a collection of computer hosts 42 connected to each other and communicating via a communication network 43. The total collection of computer hosts 42 together with the operating systems, communication means, processing means, storage means, and other computing facilities, as well as the communication network 43, and processes executing on the computer hosts 42 is the computing environment 44. Also included in the computing environment 44 is a plurality of agents 45 and services 46, which, in the illustrated embodiment, are present on the computer hosts 42. Each agent 45 and associated service 46 present on a host 42 is associated with a special agent called a Bus Agent 47. Typically, the Bus Agent 47 resides on the same computer host 42 that its associated agents 45 and their services 46 are executing, although this is not an essential requirement. In the preferred embodiment, the Bus Agent 47 is actually an agent/service combination having a very specific function and having system defined associations.

FIG. 4 illustrates several possible relationships between a Bus Agent 47 and its associated agent 45. The relationship outlined in block 410 shows agent 45 associated with Bus Agent 47 wherein both are residing and executing on the same computer host 42. The relationship outlined in block 420 shows an alternative arrangement wherein agent 45 is associated with Bus Agent 47, however, the agent 45 and Bus Agent 47 are executing on different computer hosts 42. Finally, the relationship outlined in block 430 shows agent 45 associated with Bus Agent 47 but both are embedded within the same software process 48 and hence are executing on the same computer host 42.

The task of the Bus Agent 47 is to route messages to the appropriate agents 45 under its control while simultaneously monitoring the health and status of each of the associated agents 45 and their respective services 46. Specifically, a Bus Agent 47 is adapted to detect the failure of any of its associated agents 45. In addition, Bus Agents 47 are adapted to manipulate the incoming and outgoing message flow to its associated agents 45 as well as manipulate the content of the messages. These capabilities are accomplished using various facilities (e.g. messaging facility, system management facility, etc.) that are resident in an agent library.

Figure 5:
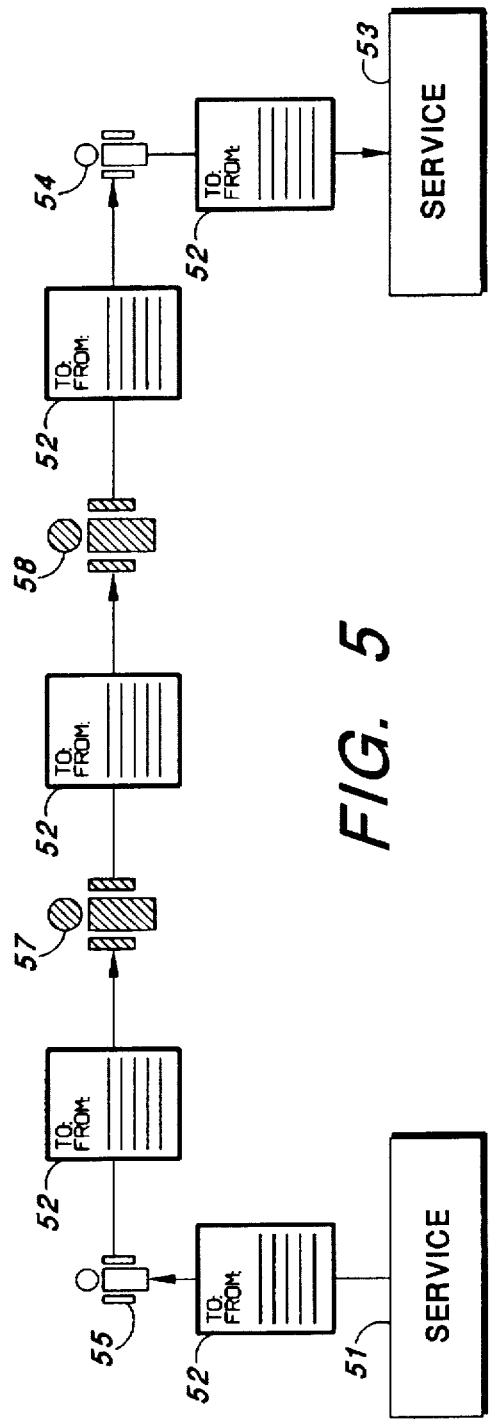
FIG. 5 is a schematic representation of selected elements of the present invention as a message flows from an originating service to a destination service.

Referring next to FIG. 5, it is seen that by utilizing the Bus Agent, agent, and service architecture, a service never actually communicates directly with another service. Services communicate only through their corresponding agents which in turn communicate via their corresponding Bus Agents. A service identifies the destination or recipient of a message by identifying the agent corresponding to the destination service. For example, if service 51 needs to send a message 52 to service 53, service 51 indicates that the message 52 destined for agent 54 which is providing service 53. The agent 55 providing service 51 receives the message and applies all necessary semantics in accordance with its defined behavior. For example, agent 55 may need to add language to the message, change addressees, encrypt the message, etc. The Bus Agent 57 controlling agent 55 then receives the message and determines the correct destination for the message 52. The Bus Agent 57 may further manipulate the message in accordance with a prescribed behavior. Finally, Bus Agent 57 sends the message 52 to the destination Bus Agent 58. Bus Agent 58 manipulates the message and forwards it to destination agent 54, where after further manipulation, the message 52 is forwarded to the destination service 53. When service 53 ultimately receives the message 52, the originator of the message 52 is identified as agent 55 (operating under the control of Bus Agent 57), which is providing the originating service 51. In this manner messages are never sent directly from one service to another service but is always controlled through the agents and associated Bus Agents.

A major capability of the present architecture is the ability of the application system designer to place the intelligence of their systems at the most appropriate places in a distributed environment. Intelligence not only represents software application logic but also application behavior. Traditionally, the intelligence in application systems has been embedded within the software application systems thus creating large monolithic systems which are difficult to change. With the advent of sophisticated Database Management Systems (DBMS), some intelligence can be embedded within DBMS triggers and stored procedures. One of the major goals of the present invention is to allow designers to move intelligence out of their application software to more dynamic and appropriate places. This reduces the need to change static application software and allows an application software system to be used in more diverse situations.

The presently disclosed system introduces a concept referred to as "Point of Control". A Point of Control implies the ability of a designer to take control of a process at a particular point in time. Controlling a process includes: (1) controlling the messages that travel between services including changing message contents, changing message destinations, and controlling message format; (2) controlling the transactional behavior of services; (3) controlling the security aspects of services and their messages; and (4) controlling where and when services execute.

Most related art systems or infrastructures have only two Points of Control. The Points of Control within a related art system or application include when an application requests a communication with another application and when the destination application receives a communication. Even with advance messaging systems that support some form of message queuing, there are still only two Points of Control with a possible third Point of Control being the queuing facility.

The present system provides a number of additional Points of Control including agents, Bus Agents, and a queuing facility, as well as the traditional Points of Control (i.e. message sending and message receiving). Specifically, the existence of agents and agent behaviors as Points of Control provides a number of ways to control the messages and overall behavior of an aspect of the distributed computing system. As you may recall, an agent is an entity having a dynamic behavior which provides and controls designated services. The Bus Agent is responsible for monitoring the health of services executing on a host computer and processes every message originating and destined from services running the host. Another Point of Control within the present system exists within the queuing facility which is discussed in more detail below. System developers may manipulate the behavior of a message queue by limiting the number of messages within the queue, controlling the order of messages within the queue, and applying security constraints on the messages within the queue or impose similar such behaviors. Each Point of Control allows the system designer or developer to change or adapt the behavior of their systems during execution.

IDENTIFICATION OF AGENTS/SERVICES

As with any distributed computing system, there exists a need to maintain information about the existence of any services and agents as well as other objects within the computing environment. The information is stored on some persistent storage (e.g. disk) associated with a computer host and is available for retrieval at any time. Once a service and agent are registered (i.e., their existence is stored on persistent storage), the service is then available to other services and agents. In addition, certain aspects of the service and agent are also defined when registered. These attributes or aspects of the agents and services are contained within the defined structure of the agent or service. In addition to the services and agents registered with the computing system, the present computing system also maintains information about other objects such as computer hosts, system partitions or domains, users, queues and other objects or entities resident in the computing environment. The preferred embodiment of the distributed computing system maintains registration information on the following objects: Services (i.e. units of work); Agents (i.e. entities that provide and control services); Hosts (i.e. individual computers in the distributed system); Domains (i.e. defined partitions within the system); Queues (information about message queues assigned to an agent); Users (i.e. individuals who are using the system); Work Flows (i.e. information about defined work-related processes); Activities (i.e. information about the steps in a process flow); and Transitions (i.e. information about the sequencing of activities in a work flow).

A domain is a logical entity which represents an area of control or partition within the computing system. As such, it represents a segment of the computing system that is broader in scope than an individual agent/service combination, yet narrower in scope than the entire computing system or enterprise. Through the creation, modification, and deletion of domains, one has the ability to partition an overall enterprise into more manageable segments and provide localized services to only the domain. Hence, the implications of domain-to-domain interaction is highly controlled.

In the preferred embodiment of the system, domains are restricted to logical entities. In one embodiment of the present system, the only components of a domain are computer host systems. Thus, if an agent/service is restricted to a particular domain, then the agent may only execute on one of the computer hosts contained within that domain. A domain further defines the scope of a number of important attributes of the system including the uniqueness of object names, security space, and transaction/concurrency space. In other words, an object name or object identifier is scoped according to a particular domain and is required to be unique within a specific domain but is not guaranteed to be unique across domains.

Another important object included within the present system are the message queues. Each agent that is registered with the present system is given a queue from which to store incoming messages. The queue can take on many forms. In support of real-time programming where there are performance and time constraints, messages can be sent to a queue represented in the physical memory of the computer host containing the destination agent if the agent receiving the message is active or running. For communications which are not critical, messages are sent to persistent queues which implies that the messages are stored on disk. In the case of persistent queues, the queue of the destination agent need not reside on the same computer host on which the agent is active. In fact, the agent need not be active when the message is received. For all queues registered within the present system, the user has control over the size of the queue, the general priority of the queue, the maximum time in which a message may reside in the queue, and whether the sender is notified when the message has been queued.

Registration information may be inserted, updated or deleted at any time. All objects, including services and agents need not be registered at the same time, however, an object's registration information is needed only when the particular object is to be used. There are at least two types of system data stores contained within the present computing system, each containing various registration information. The first type is a data store called the Configuration Database which resides on each computer host accessing the system. The Configuration Database maintains information about the configuration of the computing system as it relates to the specific computer host on which the Configuration Database resides. The second type of data store is called the Repository and contains most of the registration information and may exist in numerous forms. The Repository may be distributed across the computing environment, it may be replicated across the computing environment, or it may be localized to one computer. Any service accessing the Repository does not need to know how the registration information is maintained. The registration information is accessed through a system-based service called the Directory Service. Any issues concerning the physical aspects of the Repository used to maintain the registered information, (i.e. which vendor database management system is storing the information) is consolidated within the Directory Service, which is described more fully below. All other services are unaffected by changes to the Repository. The Directory Service can be accessed by other services to create, update and delete registered information.

Figure 6:
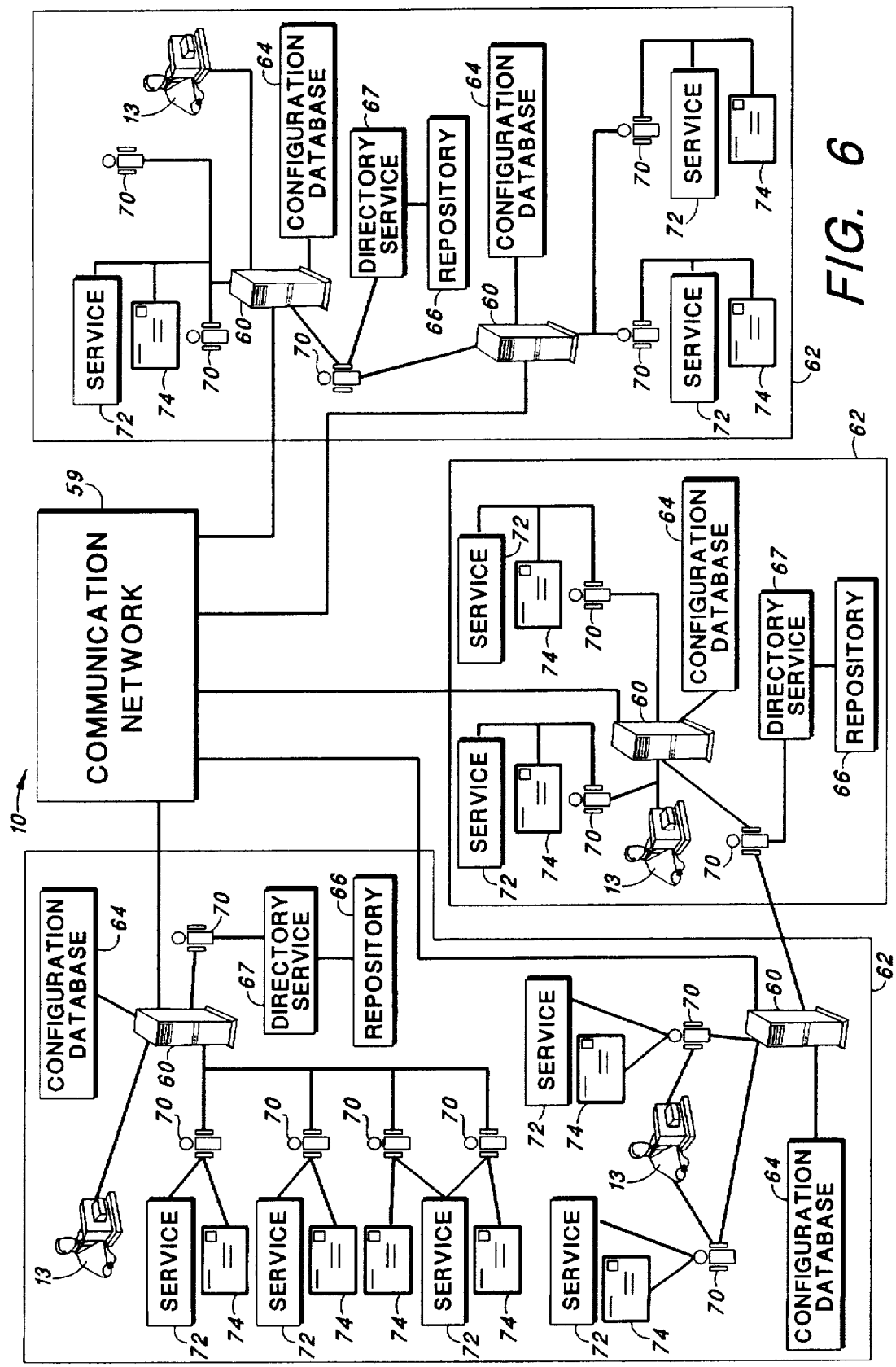
FIG. 6 is another more detailed representation of the architecture of the present invention showing additional features embodied therein.

Turning now to FIG. 6, there is shown a more detailed schematic representation of the general architecture of the present distributed computing system 10 showing the relationship of computer hosts, domains, agents, services, and the object registration information. Specifically, FIG. 6 illustrates an embodiment of the system 10 that includes a computer network 59, five computer hosts 60 partitioned into three domains 62. Associated with each computer host 60 is a configuration database 64. Each host 60 also maintains an association with the system repository 66 which distributed throughout the system. The system repository 66 is accessed through the directory service 67 via an agent 70 associated with the Directory service 67. Some of the hosts 60 are adapted to interface with users or participants 68 while all computer hosts 60 typically include one or more agents 70. The agents 70 are the entities which control or provide the plurality of services 72 distributed throughout the system 10. Associated with each agent 70 is a message queue 74 which is adapted to store electronic messages.

Every object registered within the present computing system is identified using an object identifier (OID). The OID uniquely identifies any object within the entire distributed computing system. Objects can also be identified by an Alias name. The Alias name is presented as a text string while an OID is a coded byte stream.

An Alias name for a given object is an unbounded text string whose uniqueness in the distributed computing system is bounded by a defined partition or domain as well as by the object version and object status. The object version is a numerical version number of the particular object whereas the object status is a character-based identification of the level of completeness of the object. Presently, the system supports three status values including: Definition Status, Production Status and Historical Status. Additional status values can, however, be incorporated within the scope of Alias names.

When an object status within the present architecture is identified as 'Definition Status', the object is considered under construction. As such, the present computing system does not enforce certain semantics concerning the object. Likewise, when an object status is identified as 'Production Status', the object is considered as in use and is subject to strict configuration management practice. Accordingly, the present computing system ensures certain semantics are enforced when an object has a "production status". For example, an object in the production state cannot be deleted, however, it may be amended to reflect either a 'Definition Status' or 'Historical Status'. Finally, when an object status is identified as 'Historical Status', the aspects of the object, including its Alias name, are not to be manipulated.

The present system defines a particular structure of an Alias name as containing four fields including the character field 'object name', the character field 'domain' the numeric field 'version' and the character field 'status'. When the identity of an object is queried or otherwise used, only the object name field is required need be provided. The other three fields in the Alias name structure need not be specifically identified since the present computing system applies default values for the domain, version, and status when such values are not provided. When in use, the default value for domain is the domain of the agent which is trying to identify the object, whereas the default value of the object version is the highest version for that object name and the default value for object status is the 'Production Status'.

Figure 7:
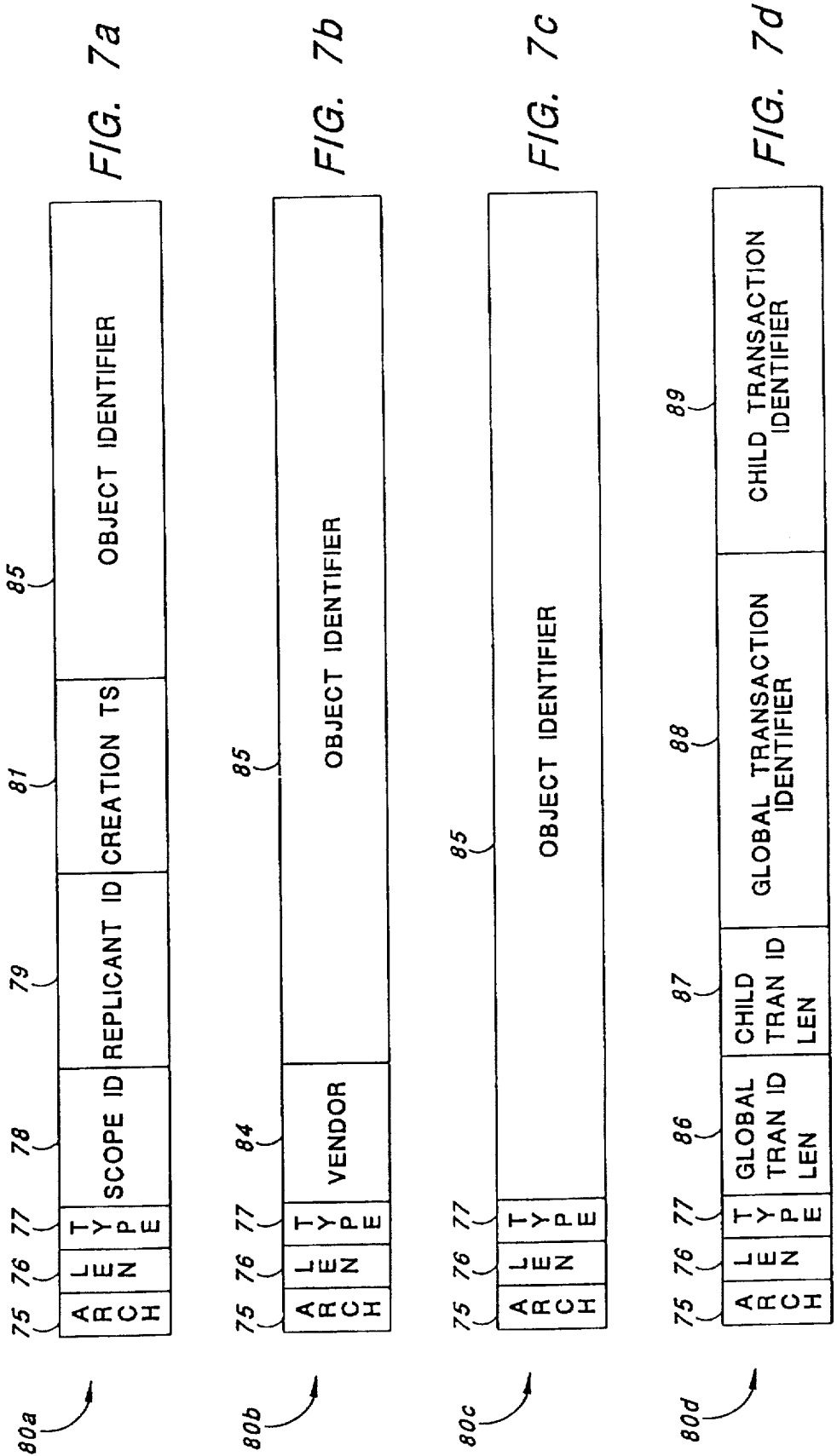
FIGS. 7a through 7d depicts the different object identification formats supported by the preferred embodiment of the system.

Alternatively, objects can be identified by using the OID. As indicated above, an OID is a byte stream which provides a means to identify and locate an actual object within the distributed computing system. An OID within the present system is a self-describing entity whose actual format depends on the object that the OID is representing. As seen in FIGS. 7a, 7b, 7c, and 7d, the four OID formats (80a, 80b, 80c, and 80d) supported by the disclosed embodiment of the present system are shown. Each of the four OID formats 80a, 80b, 80c, and 80d contain an 'ARCH', 'LEN' and 'TYPE' field or entry wherein 'ARCH' 75 is a byte value describing the architecture that generated this OID. Knowing this will allow the present system to interpret the other fields in the OID format. In other words, the values within the OID need not be in some canonical format for interpretation. 'LEN' 76 is a two byte value describing the full length of the OID and 'TYPE' 77 is a byte value describing the type of the OID. In addition, each of the four OID formats 80a, 80b, 80c, and 80d contain specific information. For example, the OID format 80a illustrated in FIG. 7a is a unique OID tailored for the present system. This OID format contains additional bytes identifying the scope of access to the object 78, the scope of replication 79, a creation time stamp 81 and an Object Identifier value 85.

The OID format 80b illustrated in FIG. 7b represents an object identifier value 85 that is defined by a particular vendor coupled with a vendor identification 84. The OID format 80c illustrated in FIG. 7c represents an abstract OID that in addition to the 'ARCH' 75, 'LEN' 76, and 'TYPE' 77 entries includes only an object identifier value 85. Finally, the OID format 80d illustrated in FIG. 7d, represents a transaction OID. In addition to the 'ARCH' 75, 'LEN' 76 and 'TYPE' 77 fields, the transaction OID format 80d includes a two-byte Global Transaction Identifier Length value 86, a two byte Child Transaction Identifier Length value 87, followed by the Global Transaction Identifier 88 and the Child Transaction Identifier 89.

As stated earlier, objects are those components which reside in the present distributed computing system and includes entities that are associated with or embodied in the present distributed computing system. Specifically, objects within the present distributed computing system include user-defined or market services, user-defined agents, hosts, domains, queues, participants, transitions, activities and process-flows. The list of objects further includes a plurality of system-based services and system agents which provide various important functions. Some of the more important objects, including system-based services and system agents, together with attributes associated therewith are broadly described in the paragraphs that follow.

SERVICES

As indicated above, a service is defined as a unit of work. Within the present distributed computing system, a service can be represented by many different entities, but are always associated with one or more agents. A service may be an agent (agent-based service), an executable (software-based service), an electronic mail (E-mail-based service), a person (an individualbased service), an item of equipment (equipment-based service), a database stored procedure or other software fragment (processing or RPC-based service), or a system service. Those services not viewed as a system service are also referred to as a market service. System-based services are associated with corresponding system agents, while most user-defined services are associated with one or more user defined agents.

Each of the services included within the present computing system is comprised of an internal structure to support, as a minimum, the capability to send and receive massages. Additionally, each service optionally includes additional capabilities or facilities particularly suited for that service. For example, a service represented by an individual typically needs only the facility to send and receive messages to and from other services. Likewise, equipment-based services may need the capability to not only send and receive messages, but also to log requests, perform self-tests, interrupt service performance, etc.

Figure 8:
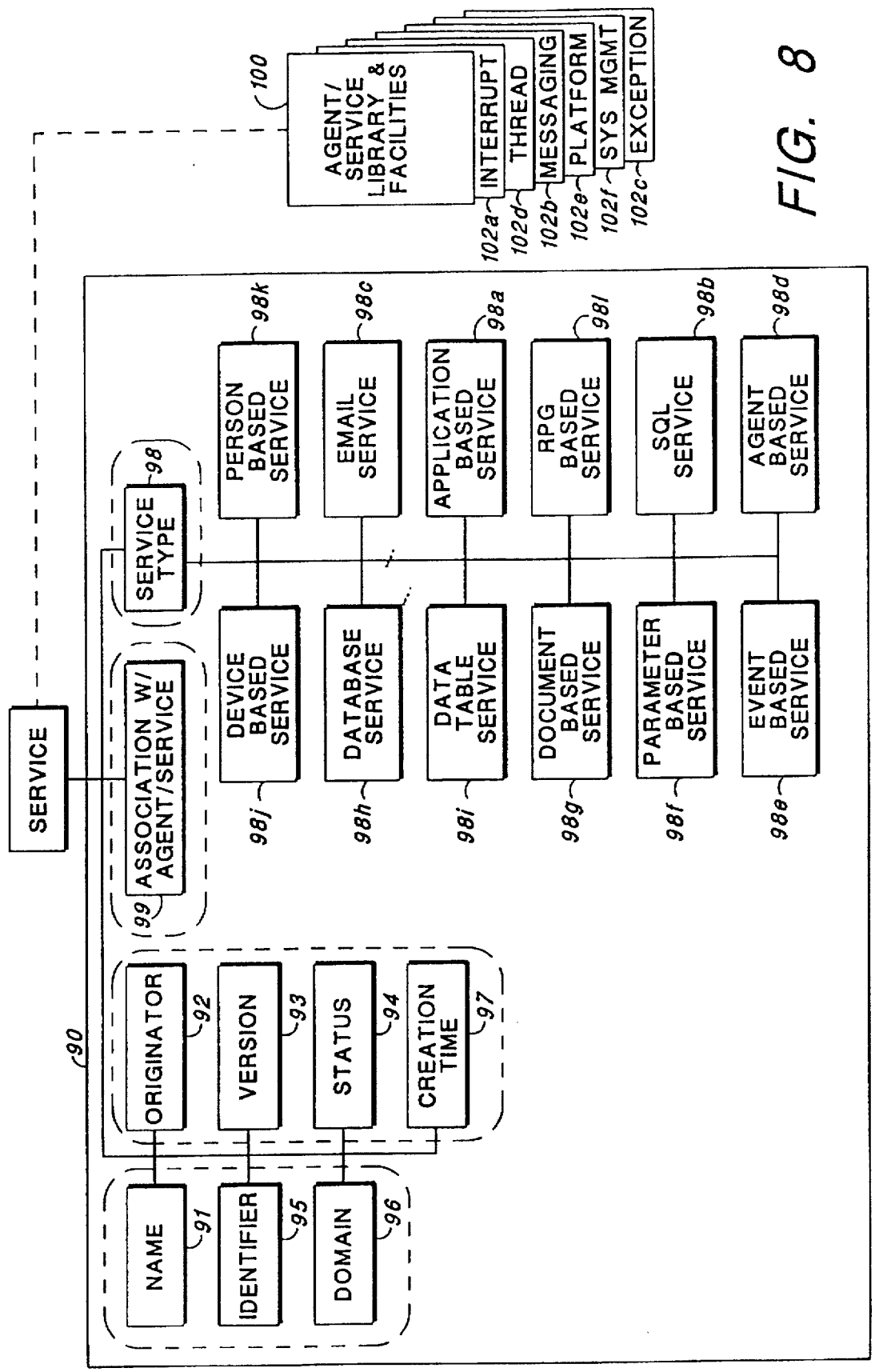
FIG. 8 illustrates the internal structure of a service in the preferred embodiment of the present invention

Each service, whether a system-based service or a market service, is associated with at least one agent and has an internal structure including one or more service-specific internal facilities. This internal structure is generically presented in FIG. 8. As seen therein, each service within the illustrated embodiment comprises a plurality of common elements including: name 91; originator 92, version 93, status 94, identifier 95, domain 96, creation time 97, type 98, and association 99. The types of services supported by the present system include an Application-based Service 98a, SQL Service 98b, EMail Service 98c, Agent-based Service 98d, Event-based Service 98e, Parameter-based Service 98f, Document-based Service 98g, Database Service 98h, Data Table Service 98i, Device-based service 98j, Person-based service 98k, and RPC-based Service 98l. Many other types of services can also be defined to meet the needs of the specific environment into which the present system is incorporated. Each of these different types of services also have additional specific elements unique to each type of service. For example, an Email Service 98c includes the additional specific elements such as Mailbox, Address, Contents. Similarly, an Applicationbased Service 98a includes, for example, the additional elements of Application Host, Username, Password, Path, and Application Name. An RPC-based Service 98m includes the additional elements of Vendor, Login Name, Database Name, Server Name, and RPC Name.

The collection of elements for each service facilitates the identification of the service (e.g. alias name, OID or similar identification tag), identification of agent associations of the service, launching of the service (i.e. making the service available for receiving messages or requests from other services), as well as other important historical information about the service.

The actual launch process depends on the type of service being launched and the behavior of the agent associated with the service. For example, launching a Application-based service implies executing the service on a defined host in the computing environment. Launching a physical device such as a heart monitor or facsimile machine implies powering and initializing the equipment. Each type of service maintains its own semantics as to what launching implies and is usually maintained within the specific elements of the service. Remember, however, that an agent associated with the service may impose additional semantics or rules with regard to launching a service. Launching a service, for example, may be time restricted or access restricted.

It should be appreciated by those persons skilled in the art that substantial modifications to the internal structure of a service can be made by combining elements, defining auxiliary elements, and quite possibly removing some non-critical elements without affecting the functionality and cooperative nature of the services, these features being central to what constitutes a service. In this manner, the present system is designed to be quite flexible in the creation of both agents and services. Advantageously, the present system does not impose harsh constraints on the type and form of the services and agents. It does, however, provide prescribed limitations in terms of functionality of its components and further maintains a degree of commonality between like components.

Services that need to cooperate must be able to communicate with each other. It is the internal structure 90 of each service together with some basic system facilities which allows the service to create messages, populate messages, and send and receive messages via an associated agent. Because all messages pertaining to a particular service are routed through an associated agent, the user retains the ability to define certain aspects of the messaging capabilities by modifying or defining characteristics of the agent. For example, a user can determine whether messages sent to or from the agent are to be secure and free from unauthorized manipulation or interrogation. Secure messages are typically encrypted prior to sending across a network.

Unlike most client-server systems which require that the server be running at all times even when no one is communicating with the server, services tend to be light-weight and non-state based (i.e., not maintaining memory resident state information that would be lost of the service terminated execution). In addition, a service can execute on different hosts on a per-request basis and as multiple concurrent services for reasons such as load-balancing and fault-tolerance.

Referring back to FIG. 8, when a service consists of a software application as opposed to a person, electronic mail, physical device, etc., an agent library 100 (i.e. Dynamic Link Library in desktop computing terminology) is provided. Software applications must link with the agent library 100 to convert the application into one or more services. The agent library provides a number of internal facilities 102 required to allow the newly created services to participate in the distributed computing system. The types of internal facilities 102 that resides within each software service include, for example, an Interrupt facility 102a, Messaging facility 102b, Exception facility 102c, Thread facility 102d, Platform facility 102e, and System Management facility 102f.

The Interrupt facility 102a provides software-based service with the ability to interrupt other services that are executing. An interruption implies stopping a service from continuing its current task and then to have the service respond accordingly to the interrupt request. The Messaging facility 102b provides a service with the ability to create, author, send and receive messages. The Exception facility 102c provides software based service with the ability to detect run-time software errors that occur. The Thread facility 102d provides a software based service with the ability to create and delete process threads to increase the performance of the software based service. The Platform facility 102e provides the software based service with the ability to execute on a number of computer platforms and operating systems. The System management facility 102f allows the software based service to track process execution behavior and to provide the information to another service if requested.

An important feature of the present system is the creation and deployment of a number of distributed services or facilities called system-based services. In the present embodiment, system based-services are software implemented services and, as such, utilize the agent library 100. Each system-based service is responsible for a set of semantics that facilitate the operation of the distributed computing system. The system-based services are designed to support important and distinct distributed capabilities. The presently described embodiment of the distributed computing system includes the following system-based services: Transaction Services; Queue Services; Event Services; Audit/Logging Services; Data Services; Identity Services; Directory Services; and Workflow Services.

TRANSACTION SERVICE

One of the most important of the system-based services is the Transaction Service which provides transaction processing and concurrency services. Transaction processing provides services with the ability to define the scope of the work to be performed. Coupled with the logging facilities described later, a particular service may undo work accomplished during a transaction if a problem occurs during processing. Services generally require a number of different transaction behaviors. A specific transaction behavior implies, for example, what type of currency behavior is expected, when and how modified data is written to a persistent store, and the semantics of a transaction abort or transaction commit. Transaction behaviors identified throughtout the industry include long transactions, short transactions, nested transactions, and cooperative transactions.

Services executing within a computing environment may at times access the same information. In order to insure consistent and well-behaved changes to data, services must synchronize their access to shared data. This is typically referred to as concurrency. Concurrency is especially important within the bounds of a transaction where multiple "bits" of shared data are accessed. As was the case with transaction behavior, services typically require a number of different concurrency behaviors. Concurrency behavior is identified in the industry as either optimistic, pessimistic, or cooperative. As was the case with transaction behavior, the present computing system directly supports a number of concurrency behaviors in order to accommodate a diverse set of market segments.

Current industry service providers are finding that Management Information Systems and commercial software applications are becoming more sophisticated and encompassing a wider range of application domains (e.g. telecommunications, design, and geographical). Providing transaction services to these software applications requires facilities that are both powerful and flexible. The present embodiment of the invention provides transaction capabilities that are designed to support on-line transaction processing applications, complex data applications, and distributed cooperating applications which are briefly described in the following paragraphs.

On-line transaction processing applications include those applications which require basic transactional facilities supported by most management information systems and commercial vendors. Transactions within this domain exhibit behavior that is short in duration and satisfies the stringent requirements of atomicity, consistency, isolation, and durability (ACID).

Complex data applications include those applications which require transactional facilities dealing with complex structures such those found in telecommunications, ECAD/MCAD, and CIM. Transactions within this domain includes a mixture of both long and short transactions, transactions that require locking at a more abstract level, and transactions that generally satisfy the ACID requirements.

Distributed cooperating applications include those applications which require transaction facilities dealing with distributed, shared, and concurrent use of data. There may be many applications processing the same data space in response to a common goal (e.g. delivering a chip design). Transactions within this domain typically exhibit the following behavior: mixture of long and short transactions but dominated by long transactions; transactions that require locking at a more abstract level; and a varying degree of ACID requirements depending on the design structure of the user (i.e. how designs are accomplished).

Transaction services to support the above application domains can be accomplished by providing a core set of features upon which industry specific functionality can be derived. The basic features supported by the transaction service facility includes: nested transactions, serializable and non-serializable isolation behaviors; optimistic and pessimistic models of concurrency; and a restricted two-phase commit model. Moreover, the transaction capabilities of the presently described embodiment are designed to encompass many (if not all) of the features found in the most dominant transaction facilities in the industry today which include: Transarc Distributed Transaction Services; Digital DECdtm; ANSI SQL2 Transaction Features; OSF/1 Distributed Computing Environment (DCE) Transaction Services; Sybase, Oracle, Informix, ASK (Ingres); X/Open Distributed Transaction Processing Model; and Unix System Laboratories Tuxedo System. Specifically, the transaction capabilities of the preferred embodiment include: (1) Beginning transactions (i.e. begin a new root/nested transaction); (2) Committing transactions (i.e. complete an existing transaction and make permanent all changes to objects that occurred during the transaction); (3) Aborting transactions (i.e. stop an existing transaction and undo any changes that have occurred to objects during the transaction); (4) Starting transactions (i.e. start work on behalf of a transaction that was begun by another application); (5) End transactions (i.e. end work on behalf of a transaction that was begun by another application); (6) Preparing Transactions (i.e. prepare a distributed transaction prior to committing the transaction); (7) Transaction callback support (i.e. allow a user to supply a procedure to be called either directly before and immediately after the occurrence of a transaction-oriented event); (8) Dynamic Coordinator selection (i.e. dynamically change the coordinator/owner of a transaction); (9) Setting ANSI SQL2 isolation levels (i.e. set the isolation level behavior of a transaction); and (10) Setting ANSI SQL2 access modes (i.e. set the access mode behavior of a transaction).

Several important features of the transaction capabilities in the disclosed embodiment include the support of nested transactions and its accompanying locking facilities, the support of isolation levels, and support of access modes. Other features of the transaction capabilities in the disclosed embodiment include explicit initiation, transaction coordination, and transaction sharing. For example, the preferred embodiment of the invention maintains the requirement that each transaction is explicitly started by an application. Currently, there is no support for the implicit initiation of transactions as defined by the ANSI SQL89 database standards. By default, the application that begins a transaction is also said to be the coordinator of the transaction. The coordinator of a transaction is the only application that can prepare a transaction for completion or commit a transaction. In order for another application to prepare a transaction, the coordinator or the system administrator must set the other application as the coordinator. In addition, where more than one application is involved in the processing of a single transaction, the transaction is referred to as a shared transaction. The applications that participate in a shared transaction do not compete for concurrent access to objects even if the applications execute in parallel (i.e. on distinct systems), however, any application involved in a shared transaction may abort the transaction.

One of the important features of the transaction capabilities in the present invention is the support of a nested transaction. In describing the support of a nested transaction, the definition of a transaction is expanded to include the support of sub-transactions or transactions that execute within transactions. These sub-transactions are typically called nested transactions or child transactions (branch transactions in X/Open XA terminology). In addition, a child transaction may itself contain any number of its own child transactions in which first child transaction is called the parent transaction. The initial transaction is called the root or global transaction. A nested transaction maintains a unique relationship to its parent transaction and to other nested transactions associated with the root or global transaction. In the presently described system, each transaction (global and nested) is given a unique transaction identifier which is used when requesting services from the Transaction Service Facility. A transaction identifier for a nested transaction consists of the transaction identifier for the root transaction coupled with a unique transaction identifier (unique among all identifiers for nested transactions under the root transaction) for the nested transaction. The application that begins a nested transaction is considered to be the coordinator of the nested transaction. A parent transaction can successfully commit regardless of the outcome of any of its child transactions. In other words, if a child transaction aborts, the parent transaction may decide to either commit or abort. Nested transactions may commit independently. By default, nested transactions within the same global transaction share the same data space. This implies that nested transactions within a global transaction do not compete for access to objects. However, special services exist to force the competition for object access within nested transactions. The special services exist for situations where each nested transaction is being handled by distinct applications (e.g. cooperative design applications). A nested transaction may also be started in a special isolated mode in which the transaction will in fact compete for object access within the global transaction. If a child transaction commits but the its parent transaction aborts, then all updates/insertions executed by the child will be undone. In other words, a commit of a child transaction is dependent on the commits of its parent and the parents parent, etc.

Another important feature is the support of isolation levels. Isolation levels define the degree at which changes/operations are visible between concurrent transactions. Isolation levels have existed in the database arena since the early 1970s and are defined within the ANSI SQL database standards. A user is able to define the isolation behavior of transactions either globally (for a domain) or when beginning a transaction. In the present embodiment, there are four isolation levels supported by the transaction capabilities. These include Level 0, Level 1, Level 2, and Level 3. Level 0 is where the transaction essentially does not lock any accessed objects and hence all changes made by concurrently executing transactions are visible. Level 1 is where the transaction essentially does not READ lock accessed objects. This allows a transaction to read the un-committed updates of another transaction. Level 2 is where the transaction essentially un-locks accessed objects between accesses. In other words, the transaction may READ lock an accessed object but the READ lock will be released sometime during the transaction. As a result, if a transaction accesses an object and then re-accesses that object, there is no guarantee that the object will have the same state. Finally, Level 3 ensures serializable transactions.

The access mode defines the range of operations available to an application during a transaction. A user is able to define the access mode of a transaction either globally (for a domain) or when beginning a transaction. The two common types of access modes supported by the system include "read-only" and "read-write". As is well known in the art, the "read-only" access mode is where the transaction may only access objects and may not change an object's state. Conversely, the "read-write" access mode is where the transaction may access and change the state of an object.

QUEUE SERVICE

The Queue service provides the basic messaging capability for agents and associated services. In particular, the queue service provides distributed queues for agents. The queues are used for storing messages sent to agents for processing. A queue is also used for store and forward capabilities when an agent is not available to receive a message for reasons such as the host containing a selected service is unavailable. Within the present embodiment, queues can be created, modified, or deleted for any given agent through the use of the queue services. Moreover, it is the user who determines if an agent is to use a persistent queue or other queue (e.g., vendor-supplied queue) to store messages. A persistent queue is one in which the messages placed in that queue are stored on disk. The user can also manipulate the size of the queue, the general priority of the queue, a maximum time in which a message may reside in a queue, and whether the sender is notified when the message has been queued.

EVENT SERVICE

The Event service provides the ability to create, update, publish and subscribe to global or system defined events. The present system is constantly monitoring its environment and reacting accordingly. This is a powerful feature which allows agents, services and users to define reactions to certain events. For example, suppose that a marketing department wishes to be informed when a project has moved into the beta-testing phase. This request can be specified to the appropriate agent and service so that when the project changes to "beta-testing" mode, an electronic mail will be sent to the department making the request. These event services provides a means of describing behavior in the form of events-conditions-actions (ECAs). ECAs describe system recognized events that trigger the present system to determine if a particular event is of interest.

IDENTITY SERVICE

The Identity service provides name services to the objects within the distributed computing system. Specifically, the Identity Service supports the creation of object identifiers which are used to uniquely identify any object within the distributed computing system. The uniqueness of an identifier can be scoped according to the request of the caller. For example, a caller may need an identifier that is unique among all objects known within the distributed computing system or an identifier that is unique only to the computer host the caller is executing on. The scope of an identifier directly impacts the cost of initially allocating the identifier. Hence, a caller of the Identity Service should request a scope for the allocated identifier that reflects the intended use of the identifier.

WORKFLOW SERVICE

The Workflow service is responsible for initiating a process flow, defining activities and transitions, defining behavior of an activity, and completing the execution of a process flow. The Workflow Service provides users with the ability to execute tasks in an order defined by the user. In this manner, the workflow service allow users to automate selected business functions which in turn allows organizations to understand their processes, optimize their processes, and reduce inefficiencies.

Through the use of the above-identified system-based services, system developers can create advance service-based applications that concentrate on market-specific issues. In other words, the system-based services facilitate the development of market services that can function cooperatively with system-based services to accomplished specified tasks.

DATA SERVICE

The Data Service provides commonly utilized data management functions such as disk I/O and caching for a specific data site. Alternatively, the data services can provide its' services for an entire domain or partition. Specific capabilities of the preferred embodiment with respect to the area of data services and data migration are discussed in more detail in the paragraphs that follow.

Data residing within the distributed computing system must have the ability to be distributed anywhere within the system and replicated if necessary. Data migration, however, requires that any data elements utilized within the present system be identified by the system. Data element identification as well as data element associations and relationships are maintained within the system schema and service library. (See microfiche Appendix F) In many applications, the actual collection, storage, and dissemination of data is accomplished by selected services which are governed or controlled by one or more agents. The actual data residing within the present distributed computing system, however, is associated with selected services via attachments. Each of the selected data services within the present system should also include facilities for translating data migration requests into the underlying system calls that actually move the data to various locations.

The preferred embodiment of the present distributed computing system support is designed to two forms of data migration, namely, fragmentation and replication. The fragmentation form of data migration allows data of a certain class to be explicitly fragmented over sites within the enterprise. Replication allows copies of the data within a certain class to migrate through the enterprise.

The present system is designed to support both value based fragmentation and user specified fragmentation, both of which are generally known in the art. Value-based fragmentation is where objects are distributed according to value(s) within the object whereas User-specified fragmentation is where objects are distributed when they created or when they are explicitly migrated in accordance with well defined rules or process flows. Fragmentation is a useful feature of the present system because it allows localization of pertinent data and allows for localized interpretation of selected data. Fragmentation is also useful for load balancing, which balances data within a local environment to reduce resource contention.

The present distributed computing system also provides capabilities to replicate data of interest on sites throughout the distributed computing environment. Replication of data is initiated either externally by a user or internally by the system. External replication is done, for example, when a user is to be temporarily disconnected from the system. Internal replication is done in order to migrate the data closer to the source of consumption and to enhance the overall performance of the system. Replicating data to local sites (i.e. sites where data is utilized and consumed) typically provides faster access to data because access requests for replicated data will be satisfied by the most local site. Replicating data at local sites also provides data fault tolerance. If a site becomes unavailable, then the data at the particular site can be found on other sites and requests for such data are routed to the most appropriate and available site containing the replicated data. Replication of data is visible only to the system administrator who defines the replicated environment. User requests to manipulate data (i.e. access and update the data) are routed to the most appropriate site for processing without intervention by the user.

DIRECTORY SERVICE

The presently disclosed distributed computing system also provides a number of functions to retrieve information about agents, services, participants, queues, and other objects. A service called the Directory Service provides the information to other services via the messaging capabilities. The Directory Service shields the callers from the details as to how the data is stored or manipulated. In fact, the Directory Service shields the callers from all aspects of the messaging facility and reduces the manipulation of directory data to mere function calls. All data returned by the Directory Service is in the form of pre-defined data structures which are accessible to the service developer.

AUDIT/LOGGING SERVICE

The Audit/Logging service provides a variety of services which provides the ability to audit transactions or log information about transactions for either tracking, security, or recovery reasons. More specifically, logging is the ability of an agent or service to maintain a history of events on some persistent store. Logging is important in the support of transactions where the log is used at transaction abort time to understand what steps are necessary to undo previous work. For defined transactions, it is the responsibility of the agent or service to specify what information is to be logged and how that information is to be undone.

AGENTS

Services can only be accessed through an entity called an agent. Viewed another way, agents are entities which provide the service, and by doing so effectively control services. Agents are not to be viewed as conventional software process residing within the memory area within a computer host. Rather, an agent may permanently reside within a computer host or may reside there temporarily. An agent has mobility such that it may move throughout the distributed computing environment and an agent may disconnect/reconnect with the distributed computing environment. More importantly, the agents are intelligent in that they demonstrate a dynamic and autonomous behavior in providing the associated services on behalf of a user or another agent. An agent's behavior is preferably controlled both explicitly by a user or system administrator as well as implicitly. In other words, an agent's behavior is adapted to be controlled both by the computing environment in which it exists together with a particular set of user defined controls.

Figure 9:
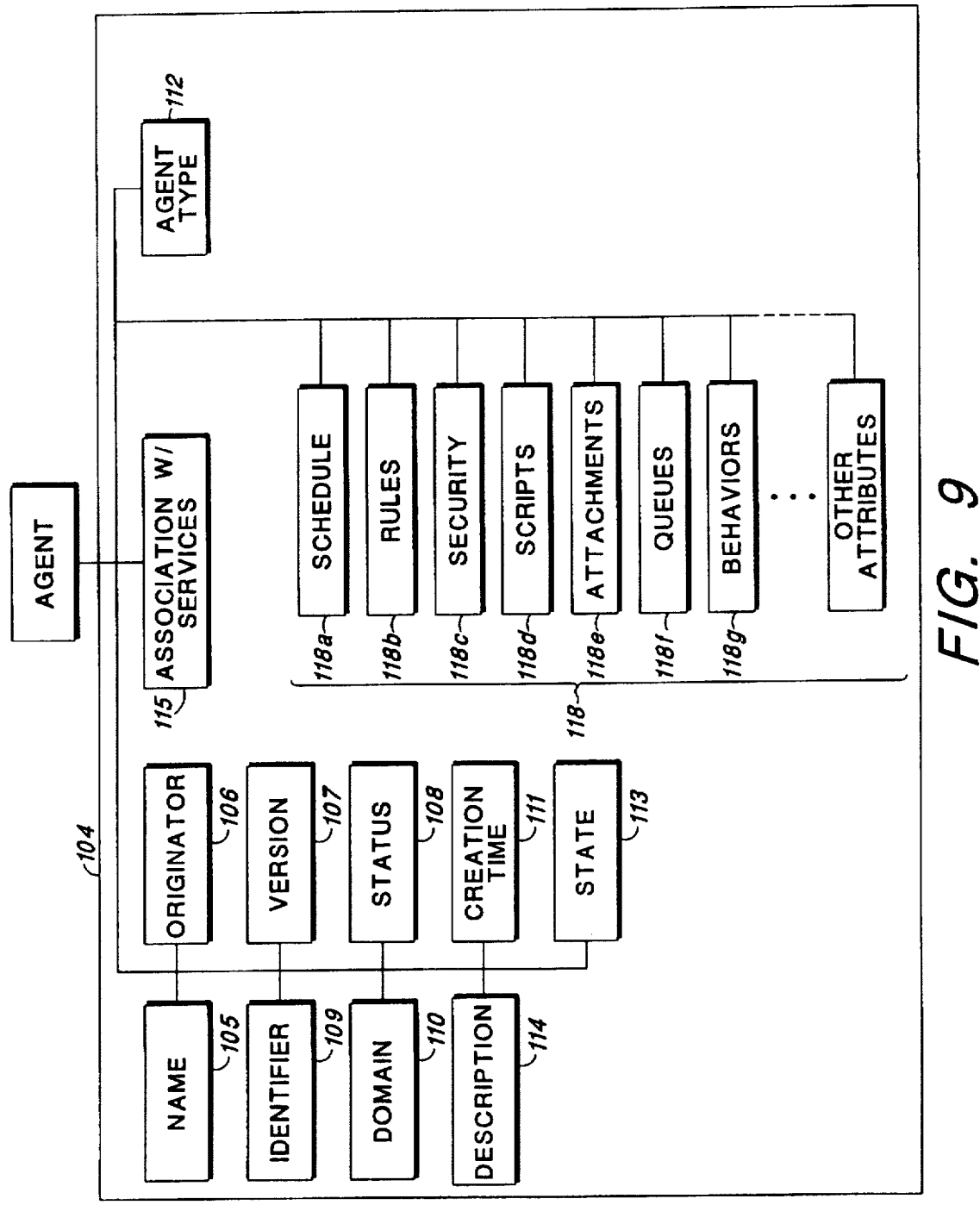
FIG. 9 illustrates the internal structure of an agent in the preferred embodiment of the present invention.

The internal structure 104 of an agent is viewed as containing several elements as shown in FIG. 9. The elements defined as part of the internal structure of an agent include name 105, originator 106, version 107, status 108, identifier 109, domain 110, creation time 111, type 112, state 113, description 114 and associations 115. In addition each agent includes one or more auxiliary structures 118 (i.e. table structures) which provide prescribed information about the agent.

In the present embodiment of the system, there are many different auxiliary structures 118 defined for an agent. For example, an agent may include a defined structure which provides scheduling information for an agent. This scheduling structure 118a allows an agent to determine the scheduling constraints of its provided service such as when a service is available and how often the service is available.

There is also a Rules structure 118b which provides rule information for an agent which allows an agent to derive behavior based on the contents of a message or other system event.

Another agent related structure contained within the present system is a Security structure 118c which provides security information for an agent. The security information effects the contents of the messages coming into a service, coming out of a service and also determines access to the provided service.

Still another agent related structure contained within the present system is a scripting structure 118d. This structure provides script information for an agent which represents a general mechanism for programing the behavior of the agent on the provided service.

Yet another agent related structure deals with Attachments. The Attachments structure 118e provides attachment information for an agent which rides along with the messages that originate from the provided service.

Two very important auxiliary structures associated with agents include an Agent Queue structure 118f and an Agent behavior structure 118g. As expected, the Agent behavior structure 118g consists of general behaviors associated with the agent and its service whereas the Agent Queue structure 118f provides queueing information for an agent including a definition of the queue assigned to the provided service.

Other agent related auxilliary structures 118 include tables containing Accounting Information, Connection Information (e.g. Disconnection and Reconnection), Resource Information, Conversation Information, Transaction Information, Transport information, Architecture Information, and, as detailed above, structures containing common and specific Service Information. All of the aforementioned structures 118 are defined in more detail in the microfiche Appendix F. Again, it should be appreciated by those persons skilled in the art that modifications to the internal structure of an agent can be made without sacrificing the advantages of the present system.

ADDITIONAL OBJECTS

The preferred embodiment of the distributed computing system also includes a variety of other objects besides agents and services. The miscellaneous objects are important elements of the present system and typically include entities such as computer hosts, users, sessions, domains, queues, process or work flows, transitions, and activities. The structure associated with most of these additional objects are identified in the system schema, and service library, attached as microfiche Appendix F.

The system schema includes the table definitions associated with agents, services, queues, domains, hosts, workflows, participating organizations and other aspects of the distributed computing system. The service library, on the other hand, reserves and defines system-based service names, domain names, and agent names. The service library also defines object identifier formats, object identifier codes as well as attribute handles. An attribute handle represents an object identifier for those languages which cannot handle byte streams (e.g. Microsoft Visual Basic) and thus cannot utilize true object identifiers.

More importantly, the service library provides detailed information concerning agents, services and other objects contained within the system schema and defines numerous other attributes and codes commonly used in the operation of the distributed computing system.

CONTROL OF SERVICES/AGENTS

Agents exert control over their associated services manipulating electronic messages between services. When two services are communicating with each other through messages, the services are said to be conversing or having a conversation. An agent can constrain the types of messages that might originate from the service it provides. In addition, it can constrain the types of messages that might be received from another service. This ability to control the conversations between services at a more abstract level than the service itself is extremely powerful. Controlling the conversation between services can ensure correctness of behavior, allow different conversations depending on the person who initiated the service, or ensure complete messages. Finally, the agent can augment a message from a service without having to modify the application code of the service.

There exist numerous manners in which an agent may examine or manipulate messages from its corresponding service. Specifically, an agent can return a message to the originator, re-route a message to another service or another agent, augment the content of a message, change or modify the content of a message, copy the message to another service for logging and auditing purposes, bifurcate a message into several messages, combine messages into a single message, hold a message for a definite or indefinite amount of time, or any similar form of manipulation.

Figure 10:
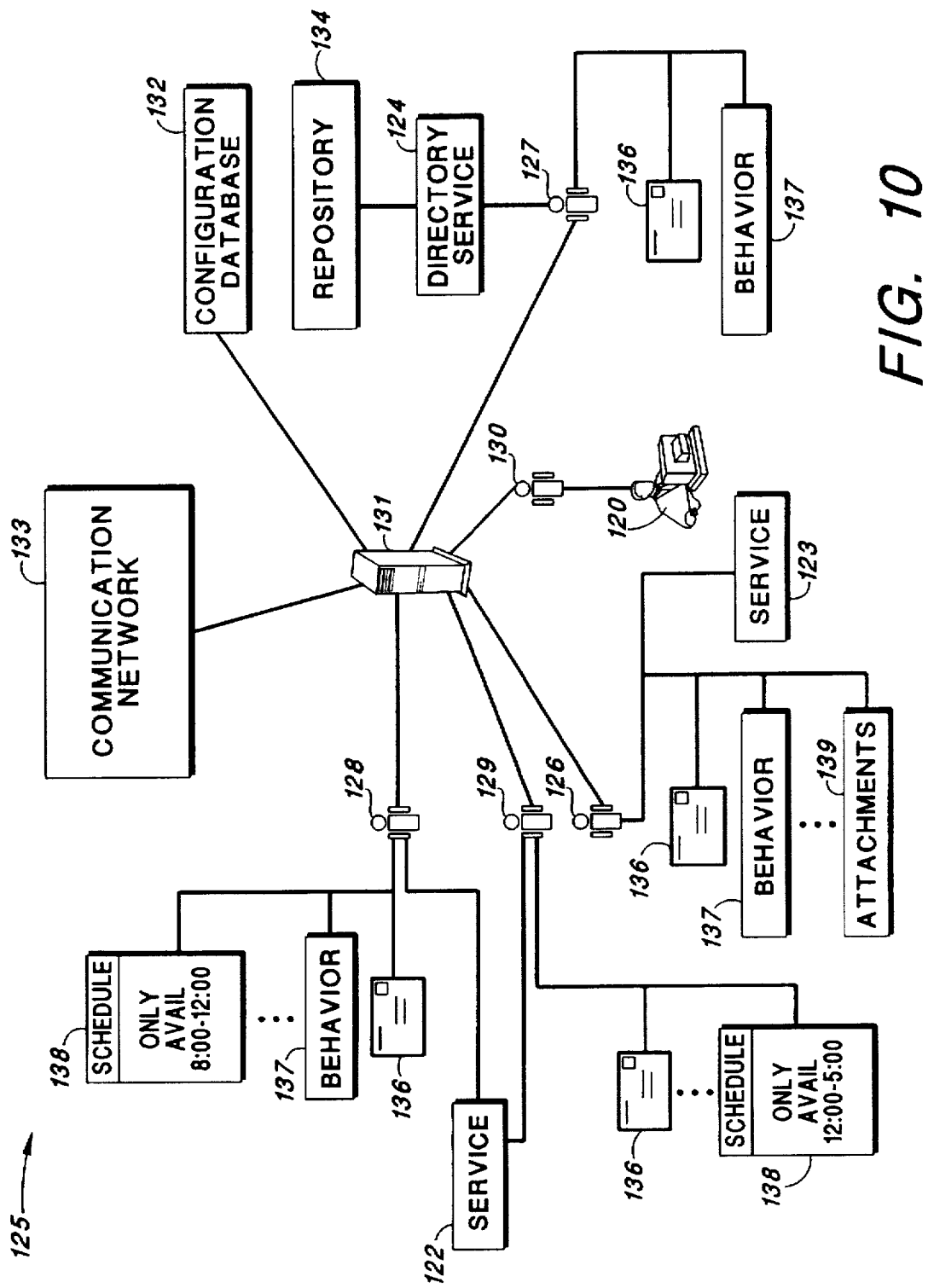
FIG. 10 illustrates an example of the use of agents in controlling services, specifically in the area of time scheduling.

Referring next to FIG. 10 which depicts an example of the use of agents in controlling services, specifically in the area of time scheduling. As illustrated in FIG. 10, participants 120 access and invoke services 122, 123, 124 registered with the present computing system 125 through one or more agents 126, 127, 128, 129 and 130. This allows a service to appear to react differently depending on which agent provides the service 122 to the participant 120. (Note that the participant is merely viewed as another service within the present computing system). The partially illustrated computing system 125 also includes a computer host 131 having a configuration database 132 attached to a computer network 133. The illustrated system also includes a repository 134 which is accessed by the directory service 124 via its associated agent 127. Each agent is shown with a message queue 136, a defined behavior 137, a schedule element 138 and/or attachments 139. FIG. 10 shows a service 122 whose associated agents have imposed certain scheduling constraints such that the service 122 which can received messages between the hours of 8:00 and 12:00 if accessed through agent 128 but can only receive messages between the hours of 12:00 and 5:00 if accessed through agent 129.

Agents are controlled both by the user as well as by the system itself. An individual user can exercise numerous types of control over agents including, for example, access control, execution or scheduling control, sequencing control, and control of the agent's distributed behavior. Access control includes the ability to designate which services or agents can request services from the controlled agent whereas sequencing control is the ability to determine when the agent is to provide its service (e.g. at which particular point within a defined process flow). Likewise, execution or scheduling control includes control over when and how long an agent is to execute. Finally, explicit control over an agent's distributed behavior includes determining whether an agent can provide its service anywhere in a computing environment, anywhere within a specified domain, or only at a specific site. User control is accomplished by manipulating the internal structure of the agent, including the associations, attachments and the many other attributes (See FIG. 9).

The preferred embodiment of the computing system also provides a number of implicit controls over agents. These implicit controls support the overall goal of efficient performance throughout the entire computing environment. For example, if a service can be executed on a number of available systems, then the computer host that is impacted the least is selected to execute the service. Optionally, agents also maintain historical information about themselves in an auxiliary element which facilitates the present system to support implicit control over the agent. In particular, agents maintain information such as statistical information relating to the processing time required to execute an associated service; the frequency of requests (i.e. number of times the agent has executed within a specific time frame); and the information concerning the recent requests for services including the last service/agent to invoke or request the controlled service.

COMMUNICATION BETWEEN SERVICES/AGENTS

Figure 11:
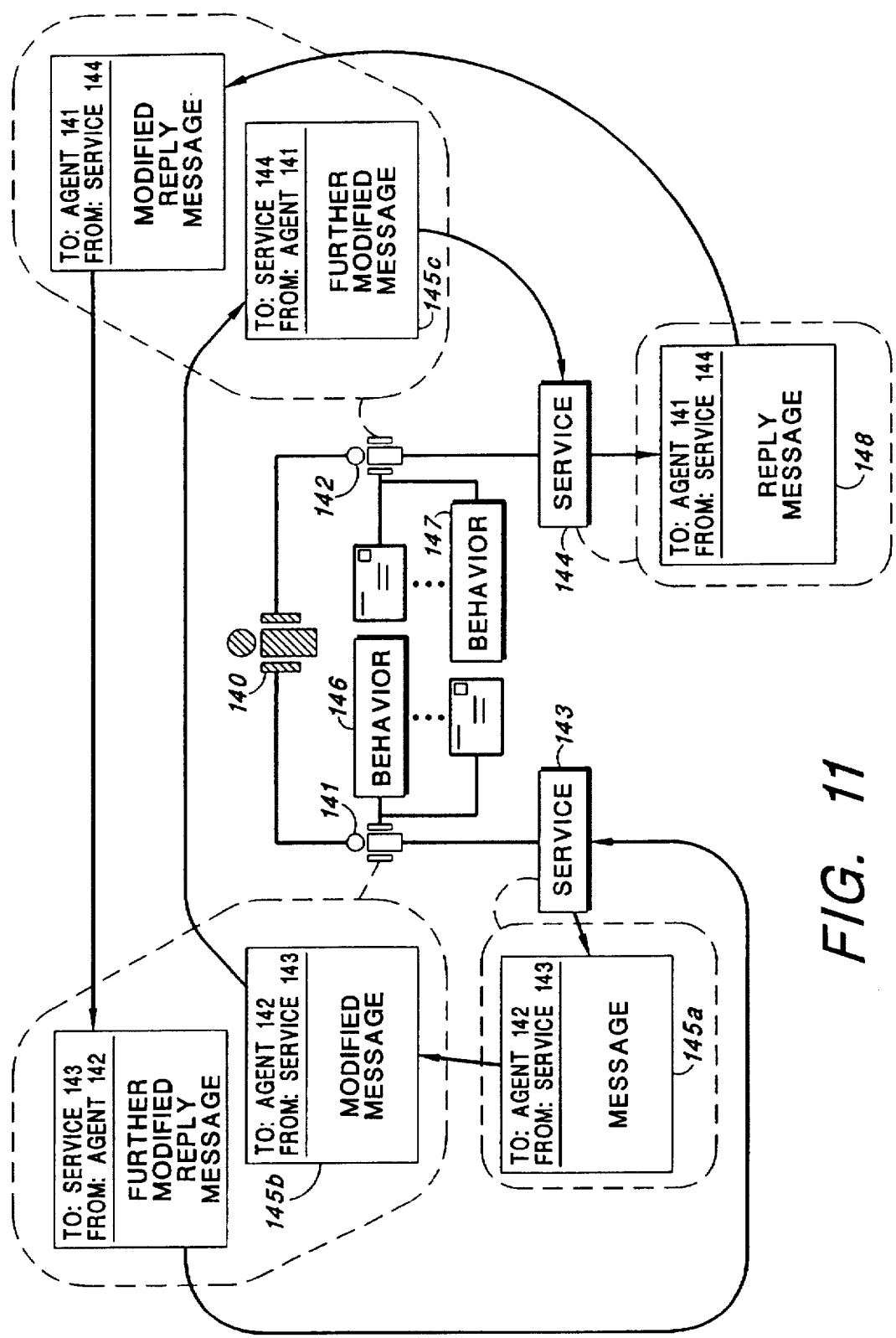
FIG. 11 illustrates an example of how a message is sent between services.

A central aspect of the present system is the messaging facilities within each service which supports the communication between services via the associated agents to accomplish specified tasks. FIG. 11 illustrates an example of how a message is sent between services.

In FIG. 11, a computer host is shown containing a Bus Agent 140, two agents 141, 142 and their corresponding services 143, 144. As indicated above, services communicate only through corresponding agents which in turn communicate via their corresponding Bus Agents. As seen therein, service 143 identifies the destination or recipient of a message 145a by identifying the agent 142 corresponding to the destination service 144. (Note that although the Bus Agent(s) 140 is also involved in the communication path between services, reference to the Bus Agent(s) 140 is omitted for clarity). The originating agent 141 is free to manipulate the original message 145a in accordance with a defined behavior 146. The manipulated message 145b is then physically delivered from the originating agent 141 to the destination agent 142. The destination agent 142 then further manipulates the electronic message 145b, in accordance with it's defined behavior 147. As part of the defined behavior, the destination agent 142 changes or modifies the incoming message 145b such that the originator of the message is now identified as the agent 141 corresponding to the originating service 143. The destination agent 142 then forwards the modified message 145c to the destination service 144. Any replies 148 to the original message is then addressed to the originating agent 141 since the destination service 144 believes that agent 141 to be the originator of the message. In this manner the message path is never directly from one service to another service but is always controlled through the agents.

Although there are a number of components and independent steps involved, the invoking of agents and communication between services runs comparatively fast. Moreover, in any service to service communication within the present invention there are at least four opportunities where control over message flow, message content and message destination are applied. These four additional points of control include the requesting service's agent, the Bus Agent associated with the requesting service's agent; the receiving service's agent; and the Bus Agent associated with the receiving agent. Furthermore, each of these points of control are adapted to demonstrate a different behavior such that the services appear to dynamically interact with one another.

Figure 12:
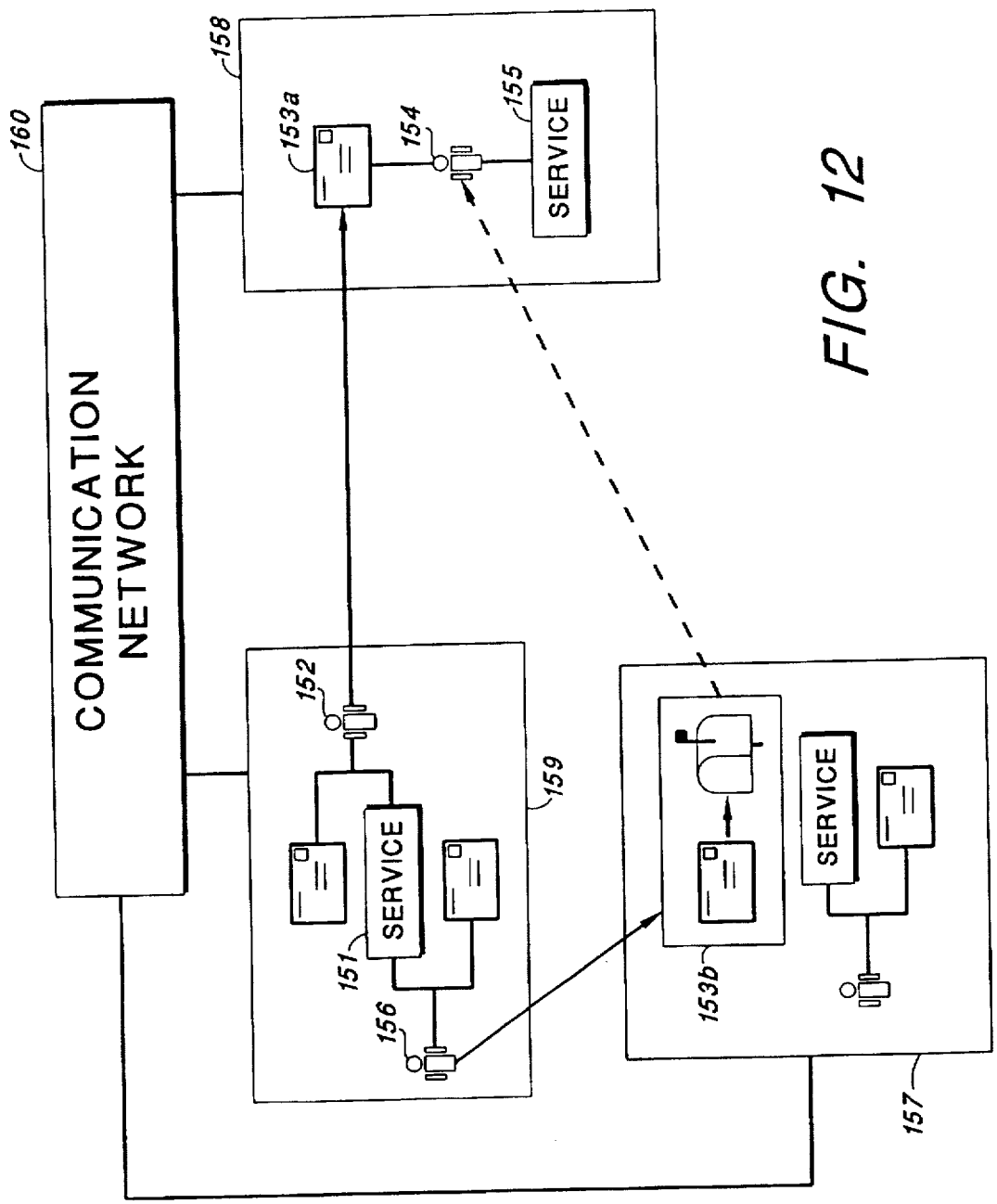
FIG. 12 depicts the queuing capabilities of agents within the present system by illustrating alternative techniques in which a message destined for a particular service is queued by an associated agent.

Turning next to FIG. 12, any message destined for an agent could be delivered in two ways. The message originating from service could be delivered from the originating agent 152 directly to a memory resident queue 153a for immediate consumption and manipulation by the destination agent 154 after which it is forwarded to the destination service 155. The message could also be delivered from an agent 156 associated with the originating service 151 to a persistent queue 153b (sometimes known as a mailbox) for consumption and manipulation by the destination agent 154 at some later date. As seen in FIG. 12, the persistent queue 153b may actually reside on a different host 157 than the host 158 on which the destination agent 154 resides or the host 159 on which the originating agent 156 resides so long as the hosts are connected to the communication network 160. An originating service 151 that sends an electronic message to another service 155 is not concerned with where and how the message will be delivered. The destination agent 154 has its queue already defined as either being memory resident queue 153a or a persistent queue 153b. Hence, when addressing the message to a specific destination agent 154, the destination queue is already determined.

Services are able to communicate through a messaging facility provided by an agent library and service library. The message facility provides an electronic mail-like service in which an agent sends a message to a recipient(s) (i.e. another service). The present system ensures that a message, once sent, will arrive at its destination. In addition, the present invention insures that if the message is fragmented, which is the case for large messages traveling through a LAN or WAN, the fragments will arrive in the correct order or at least appear that way to the recipient. In essence, this behavior mirrors some of the behavior of the TCP/IP connection-based network interface without the additional capabilities and expense of full TCP/IP support.

Figure 13:
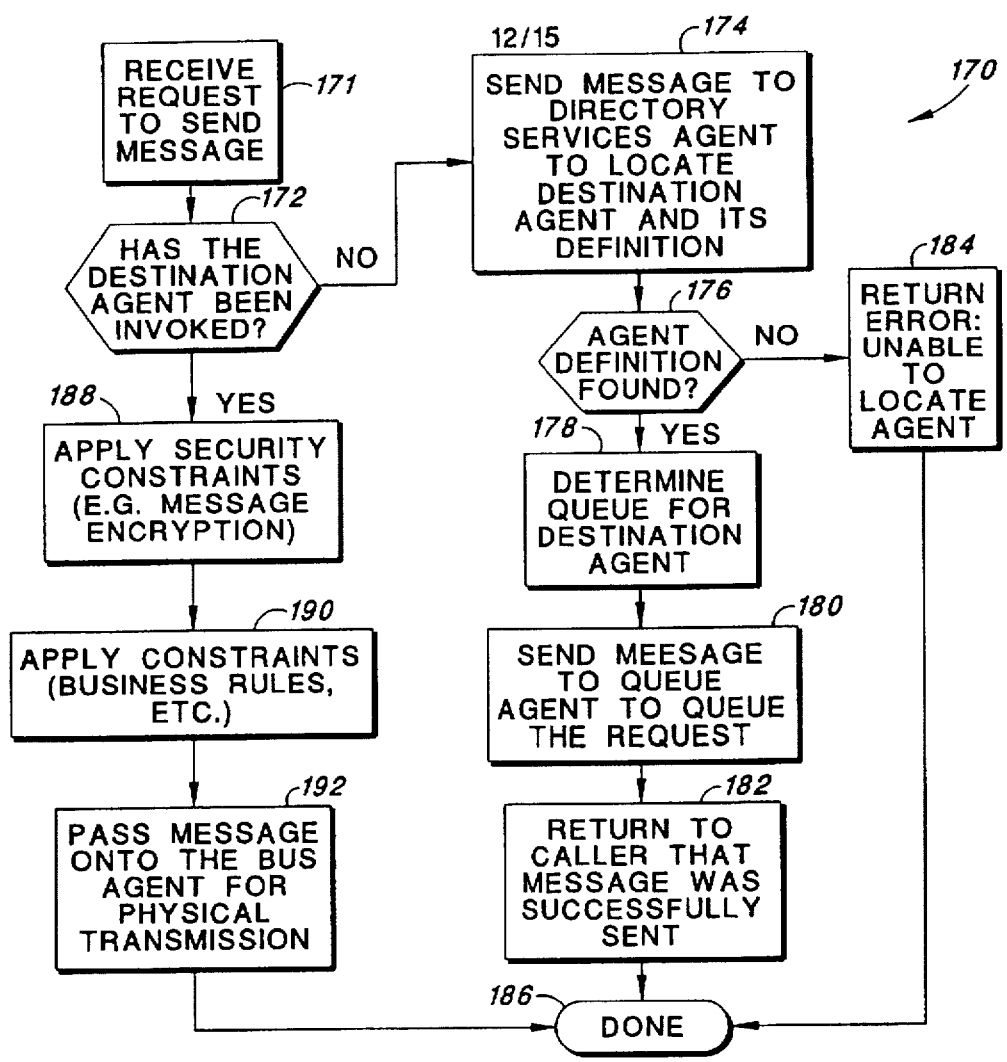
FIG. 13 is a flow chart depicting the steps involved in sending a message to a destination service.
Figure 14:
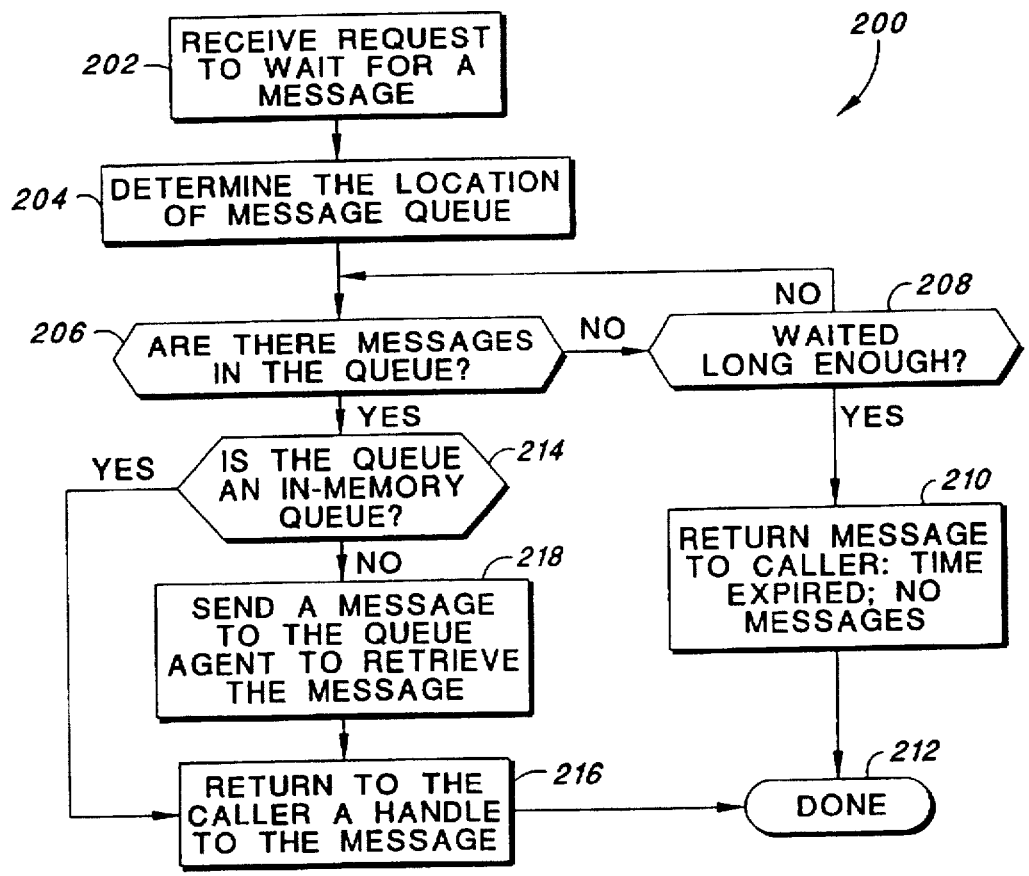
FIG. 14 is a flow chart depicting the steps involved in receiving a message from an originating service.

Turning now to FIGS. 13 and 14, there is shown overly simplified flow charts of the messaging capabilities of the present invention with each step being generally represented by a block and corresponding reference numeral. FIG. 13 illustrates the steps involved in sending a message to a destination service 170. The depicted process starts when a requesting service receives a request to send a message (block 171) to another service (i.e. destination service). The next step is to determine whether the destination agent has been invoked (block 172). If not, (NO branch of block 172), the next step is to send a message to the Directory Service's Agent requesting that the Directory Service locate the destination agent and the destination agent's definition (block 174). If the destination agent and it's definition are found (YES branch of block 176), one must determine and locate the queue for the destination agent (block 178). Since the destination agent is not invoked, the next step is to send the original message to the Queue Agent requesting the Queue Service to queue the message (block 180). Once queued, another message is sent to the originating service (via the originating agent) the original message was successfully sent and the send message operation ends (block 182). If, however, the destination agent and its definition are not located (NO branch of block 176), an error message is returned to the originating service (via the originating agent) that the destination agent was not located (block 184) after which the send message operation ends (block 186).

Finally, where the destination agent is already invoked (YES branch of block 172), security constraints are applied by the originating agent (block 188). The originating agent then proceeds to manipulate the content of the message in accordance with prescribed rules and defined behaviors (block 190). Once the manipulation is complete, the message is forwarded to the Bus Agent (block 192) for further manipulation and physical transmission of the message to the destination service (via the destination agent) which completes the send message operation (block 186).

FIG. 14 is a flow chart illustrating the steps involved in receiving a message from an originating service 200. The process initiates with the receipt of a request to wait for a message (block 202). The next step is to determine the location of the message queue associated with the receiving agent (block 204). Once located, the queue is examined to determine whether there are any messages in the queue (block 206). If not, (NO branch of block 206), the receiving agent waits a prescribed period of time while continually checking to see if any messages have been received in the queue (block 208). If the receiving agent has determined that the prescribed waiting time has expired, another message is generated and returned to the caller that the waiting period has expired without having received the original message (block 210). At this point, the process no longer waits for the message thus ending the receive message operation (block 212). However, as soon as there are messages appearing in the queue of the receiving agent, (YES branch of block 206), the process the determines whether the queue is an in-memory queue (block 214) and if so, returns a message identifier to the caller designating the location of the message (block 216). If, however, the queue is not an in-memory queue (NO branch of block 214), a message is sent to the Queue Agent to retrieve the message (block 218) and then proceed to return a message identifier to the caller designating the location of the message (block 216). As soon as the message identifier is returned to the caller, the receive message operation ends (block 212).

As seen from FIGS. 13 and 14, the messaging capabilities of the present system employ several alternative models of communication. Basically, the present system supports both a push and pull model of communication. A requesting service can always invoke another service (destination service) and then communicate with that destination service with electronic messages. As defined above, a message is a formatted string of data or information that travels through the distributed computing system, particularly between services. This provides real-time behavior by ensuring that a message will not end up residing in a message queue for some undetermined amount of time. This type of behavior is considered push model since the requesting service is pushing the message to a destination service.

A service can also send messages to a message queue in which a recipient service can pull work out of the queue at its convenience. This type of behavior is considered a pull model since a service pulls work to do from its message queue. Each agent identified within the present system has its own message queue. The service provided by that agent uses the agent's queue for messaging. A message queue is merely a place where messages destined for a particular service are collected for retrieval. The present system allows the users to manipulate the behavior of a particular queue. For example, the maximum number of entries in the queue, the ordering of entries in a queue, the maximum time an entry may reside in a queue, and whether the queue is secure or not are all behaviors that are manipulated by the user.

Figure 15B:
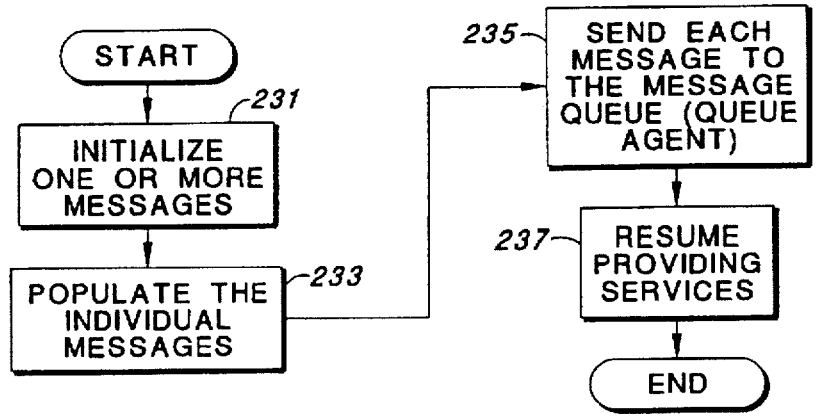
FIGS. 15a and 15b illustrate the general message flow from one service to another using the various models of communication.
Figure 15A:
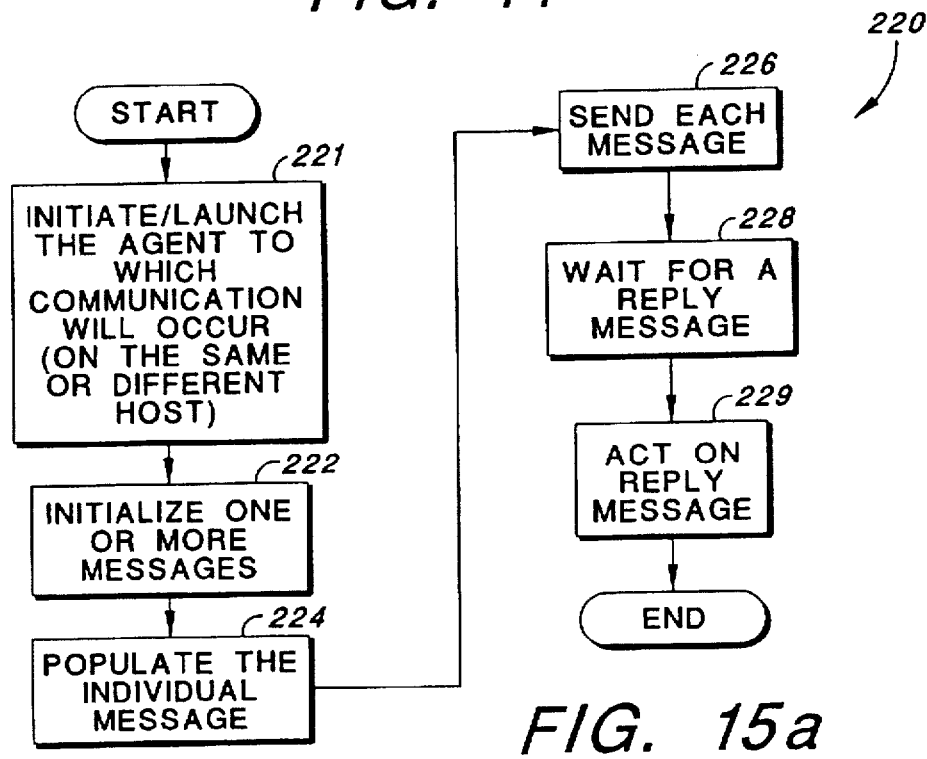

The various models of communication are broadly depicted in FIGS. 15a and 15b. As seen therein, the messaging capabilities of the present system preferably operate on the premise that a requesting service knows, or can readily determine, the identity of the destination service to which it needs to send a message. In addition, the requesting service must further determine whether to invoke a push model of communication or a pull model of communication.

If the push model of communication is selected, the process initiates six basic steps for communication in the push model 220. As seen in FIG. 15a, the first step in the push model 220 involves a service launching a destination service and corresponding agent to which communication will occur (block 221). The destination service and corresponding agent may reside on the same or different computer. The next step is for the requesting service to initialize one or-more messages (block 222). The requesting service then populates the individual messages (block 224) and subsequently sends each message to the destination service (block 226). Upon receipt of the message by the destination service, the services acts on or processes the request. Concurrently, the requesting service may continue providing its service while awaiting a reply or may cease providing its service until a reply is received (block 228). As soon as a reply is received, the requesting service acts on the reply (block 229). The reply process is essentially another messaging process where the services reverse roles (i.e. the original requesting service is the new destination service while the original destination service is the new requesting service, although the electronic message representing the reply need not be an actual request for services).

Alternatively, FIG. 15b shows the four basic steps of communication in the pull model 230. Where the push model of communication is not selected, the default communication mode is the pull model. In this case, the requesting service invokes a pull model 230 of communication by initializing one or more messages having a selected destination service (block 231). In the pull model of communication, the requesting service does not need to be aware of whether the destination service is available to receive messages or not. The requesting service then populates the individual messages (block 233) and sends each message to the message queue corresponding to the destination agent (block 235). As the message is sent, the requesting service continues working by providing it's services (block 237). When available, the destination service retrieves the messages from the message queue associated with its corresponding agent and acts on the request.

APPLICATION INTERFACE

One of the primary objectives of the present computing system is to provide services to address and solve specific user defined problems. Such services are referred to as Application-based services or market services. Such market services may augment existing vendor applications by providing interconnectivity between the vendor application and other services. Market services may also be developed to perform specific tasks or functions needed by the participant. In either event, service developers require various tools in order to develop customized services and develop applications through the cooperative behavior of many services.

The present system contemplates providing many of the developers tools via a plurality of application interfaces which invoke certain capabilities of the present system. Included among these capabilities are the ability to create, modify, or delete services, agents and other objects. In addition, the present system provides application interfaces to support many different transaction capabilities, messaging capabilities, work flow capabilities, parallel processing capabilities and other capabilities commonly found in the related art distributed computing systems. A partial listing of the application interfaces, including a description, syntax, parameters, and replies are provided in Appendix G. Advantageously, the present system does not require the service developer to learn a proprietary language in order to build services. Market services are developed in whatever language the developer chooses. Developers may actually construct distributed systems which contain market services that were built from a number of different vendor products and a number of different languages but which utilizes enough basic services (i.e. system services) to allow the various market services to cooperate. In particular, the present system imposes a vendor independent messaging capability on all developed services which facilitates communication between the services to accomplish the intended tasks. More importantly, the present system is built using the same basic services provided to developers. In other words, the present system is built within itself and can be readily modified by developers to be consistent with whatever standards and requirements are necessary. For example, the preferred embodiment of the present system is built using the C programming language. If, however, a participant using such embodiment has an organizational requirement to utilize only the ADA programming language in all applications and services it develops. The present system allows developers or other users to modify or replace any number of the basic or system services with equivalent services developed in the ADA programming language, without affecting the functionality/operation of the system. In fact, the participant can maintain a system configuration developed in a number of languages.

CONFIGURING THE SYSTEM AND INVOKING AGENTS

If the system has not previously been established, the participant selects a computer host as the initial starting site. The processor within the computer host is used to merely initialize the system and is not necessarily used or viewed as a central site for the system. Once a computer host is selected, the initialization of the system begins by defining all known participants, hosts, services, agents, workflows, and other objects that are to be included in the distributed computing system. In addition, these and other participants, hosts, services, agents, and objects can be subsequently added to the system, removed from the system, or otherwise modified within the present system. Once configured, the functional operation of the present system is described as essentially including three basic processes. The basic processes include (1) invoking agents and launching the associated services; (2) cooperatively performing prescribed tasks through the sending and receiving of electronic messages between services via their associated agents; and (3) detaching agents and the associated services from the system. The prescribed tasks can be defined, for example as a workflow or can be defined and developed by individual participants as the need arises.

Figure 16:
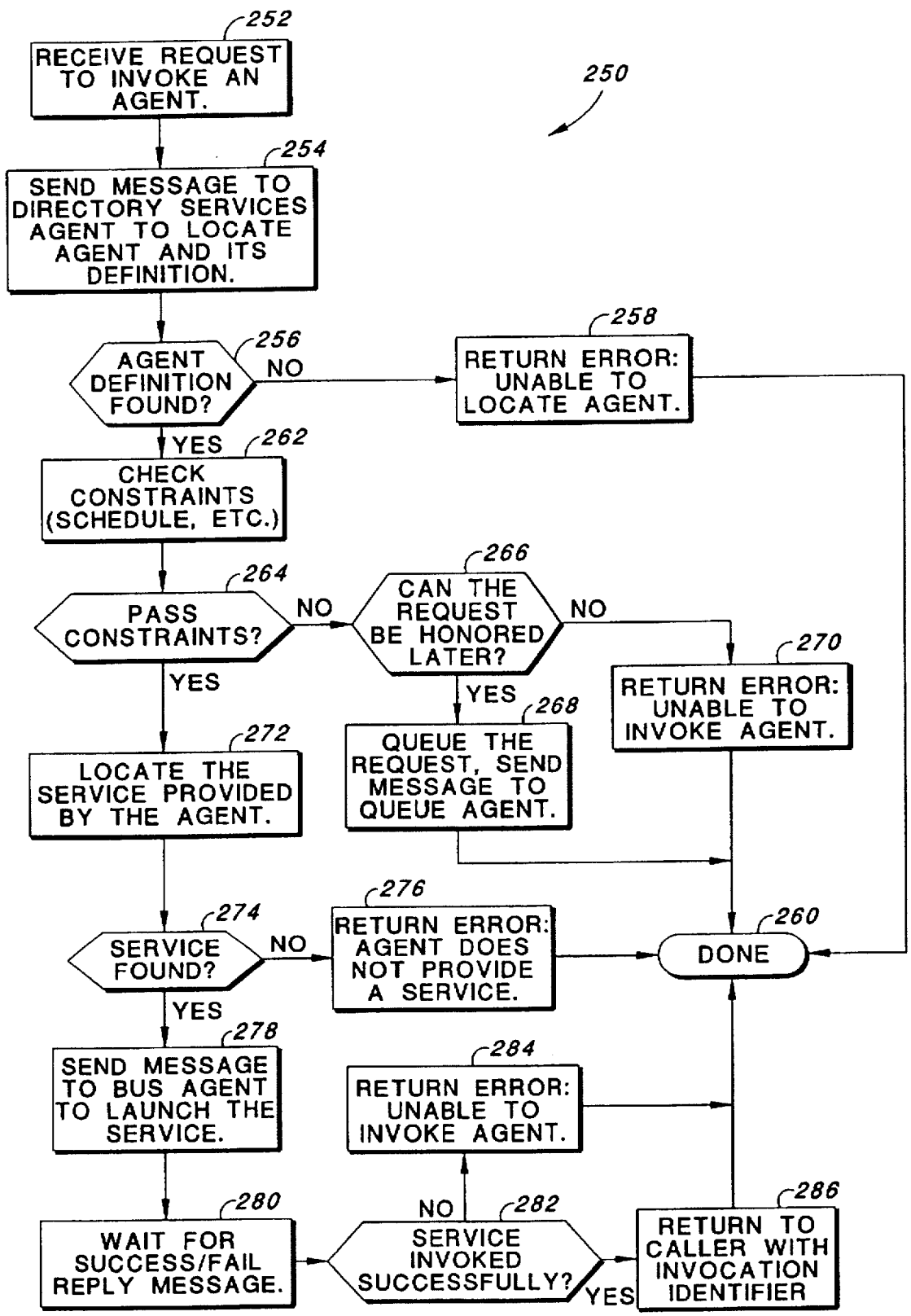
FIG. 16 is a flow chart depicting the steps involved in the launching or invoking an agent and associated service.
Figure 17:
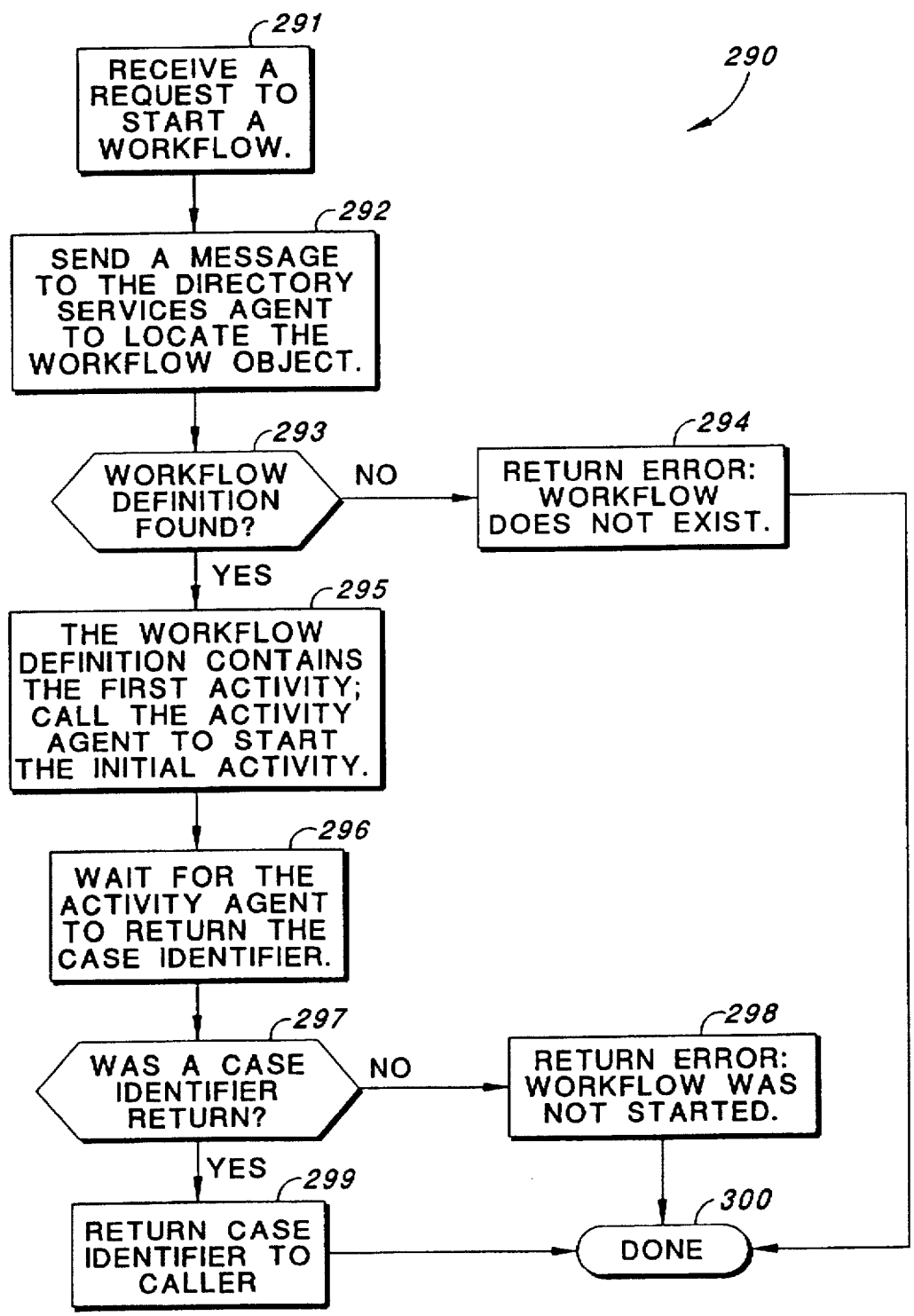
FIG. 17 is a flow chart depicting the steps involve in the starting a work flow.

FIGS. 16 and 17 are flow charts depicting the steps involved in the launching of an agent and associated service and the process of starting a workflow, respectively. As with the messaging capabilities of the present system, the process of invoking and launching objects operate on the premise that a requesting individual or service knows, or can readily determine, the identity of the workflow, agent and/or service that is to be invoked or started.

The process of invoking an agent (FIG. 16) and launching the associated service 250 begins with the receipt of a request to invoke a particular agent (block 252). The next step is to send a message to the agent associated with the Directory Service requesting that the Directory Service locate the agent to be invoked and it's definition (block 254). If the agent to be invoked and it's definition are not found (NO branch of block 256), an error message is returned indicating that the agent to be invoked was not located (block 258) and the process terminates (block 260). If, however, the agent that is to be invoked is found (YES branch of block 256), the various constraints (e.g. scheduling constraints, security constraints, etc.) must be checked (block 262). If it is determined that the request to invoke the agent violates one or more of the constraints (NO branch of block 264), a determination is made as to whether the request can be honored at a later time (block 266). If the request cannot be honored at a later time (NO branch of block 266), an error message is generated and forwarded back to the original requestor indicating that the request to invoke the identified agent is denied (block 270), at which point the process is complete (block 260). If the request can be honored at a later time (YES branch of block 266), the request to invoke the agent is sent to a queue (block 268) where the request is further processed at a later time. In other words, the original message is sent to the Queue Agent requesting the Queue Service to queue the message. Once the message is sent to the Queue Agent the invocation process is complete (block 260).

On the other hand, if it is determined that the request to invoke the agent does not violate any of the constraints (YES branch of block 264), the next step is to locate the service provided by the invoked agent (block 272). If the service is not located (NO branch of block 274), then an error message is sent back to the original requestor indicating that the invoked agent does not provide a service (block 276), at which point the process is complete (block 260). Conversely, if a service associated with the invoked agent is located (YES branch of block 274), then a message is sent to the Bus Agent controlling the invoked agent to launch the located service (block 278) and wait for a reply message (block 280). If the reply message indicates that the service was not successfully launched (NO branch of block 282), an error message is returned to the original requestor indicating that the service could not be launched (block 284) and the process ends (block 260). However, if the reply message indicates that the service was successfully launched (YES branch of block 282), a return message including the invocation identifier is sent to the caller (block 286). Having successfully returned the invocation identifier to the caller, the process for invoking an 20 agent and launching the appropriate service is complete (block 260).

Similar to the process of invoking an agent, the process for starting a workflow (FIG. 17) 290 begins with the receipt of a request to start a particular workflow (block 291). The next step is to send a message to the agent associated with the Directory Service requesting that the Directory Service locate the workflow object (block 292). If the workflow to be started and it's definition are not found (NO branch of block 293), an error message is returned indicating that the workflow does not exist (block 294) and the process terminates (block 300). If, however, the definition of the workflow to be started is found (YES branch of block 293), the agent controlling the first activity defined within the workflow is invoked (block 295) in a manner similar to that described with reference to FIG. 16. The next step in the process is to wait for the activity agent to return a case identifier (block 296). If the Activity Agent does not return a case identifier (NO branch of block 297), a error message is returned to the caller indicating that the workflow was not started (block 298) after which the process terminates (block 300). If, however, the Activity Agent returns a case identifier (YES branch of block 297), a return message including the case identifier is sent to the caller (block 299). Having successfully returned the case identifier to the caller, the process is complete (block 300).

As detailed in the above-discussion, whenever a message cannot be delivered, either because the agent controlling a requested service was unable to be located, the agent is unable to be invoked, the workflow is unable to be started, or the service is unavailable, an error message is returned to the requesting service indicating the problem. As the error message is sent back to the original requesting service, each agent and Bus Agent along the message path is provided an opportunity to manipulate and control the message. For example, an agent processing an error message may discard the error message and attempt to locate an alternative service via another agent or may modify the original request and resubmit it to the intended recipient.

CREATION AND DEPLOYMENT OF SERVICES

The present embodiment of the invention supports a number of computation and communication paradigms for service development. Using a small number of constructs, developers are able to create powerful services. Some of the paradigms possible for service development are Master-Slave, Fault-Tolerance, Load Balancing, and Cooperative. In the Master-Slave paradigm, a service can launch one or more slave services and send each slave a task to accomplish. The master service can then wait for the slave services to complete processing. In the Fault-Tolerance paradigm, a service can replicate its tasks to other services to keep buddy services. A buddy service would continue to synchronize with the original service until some point when it was necessary for the buddy service to take on the responsibilities of the original service (i.e. when the original service fails). In the Load-Balancing paradigm, a service can distribute its tasks to one or more services which are executing throughout the network. The originating service can then monitor and process results from the other services. Finally, in the Cooperative paradigm, one or more services can create a dialog through message passing in which the services collaborate to accomplish a task. Since the present embodiment of the invention does not enforce a call/return paradigm, more intelligence can be designed into an service. This would not be the case if the service would have to be designed into a number of software procedures.

The following paragraphs help describe the general format and basic functionality of services. However, the service developer is certainly not restricted to the examples and paradigms described herein.

The functional capabilities of a service includes, as a minimum, the ability to: (1) attach itself to the invention; (2) initialize, populate, and send messages; (3) wait for messages; and (4) detach itself from the invention. In the preferred embodiment, the capability to attach the service to the invention is accomplished by invoking the function esbAttachToBus( ) which makes the service and associated agent visible to other services and also initializes internal structures required to process messages. Conversely, the function esbDetachFromBus( ) is used to detach the service from the invention which makes the service unusable by other services and frees the memory used to support the service (See Appendix G). The other basic capabilities of a service involve messaging. The basic communication paradigm in the present system are electronic messages which consist of a stream of data bytes and which are typically constructed by the developer using an Application Programming Interface.

The following is example of service development which may help to clarify the format and functionality of a service. The sample service being developed is a software based service written in the C programming language and references a number of functions that are found in the Appendices. The example leaves out any error processing:

```
ESB_OBJHDL       msgId;
ESB_INT32        msgFlags;
esbTypeName      agentName;
ESB_OBJHDL       agentId;
ESB_OBJHDL       recvMsgId;
ESB_OBJHDL       destAgentId;
ESB_CHAR         retName[30];
ESB_INT32        type;
esbArgValue      argValue;
ESB_INT32        valLen;
/*
* Attach ourselves to the system.
*/
esbAttachToBus( "SampleApplication");
/*
* Launch the agent which is to provide the service
* we need. We won't specify a host so let the
* system pick the host. The parameter 'agentId'
* will contain the handle to the invoked agent.
*/
agentName.name = "doMyWork";
esbInvokeAgent( &agentName, &agentId, NULL, NULL,
NULL);
/*
* Create a new message. We don't want our message
* to be encoded so request RAW encoding
*/
ESB_SET_FLAG( &msgFlags, ESB_MSG_RAW);
esbNewMessage( &msgId, &msgFlags);
/*
* We plan to send a message to our launched agent.
*/
esbAddRecipient( &msgId, agentId);
/*
* Populate the message and send it.
*/
esbAddArg( msgId, "operation", ESB_
INTEGER_TYPE, GRAB_INFO, NULL);
esbSendMessage( msgId, NULL, ESB_PRIO_LOW, ESB_
SEND_ASYNC);
/*
* Wait for a success response.
*/
esbReceiveMessage( &destAgentId, NULL, NULL,
&recvMsgId, NULL);
/*
* Slurp up the response message.
*/
esbGetNextArg( retName, &type, &argValue, &valLen);
if (argValue.val.longVal != ESB_SUCCESS)
return( someErrorprocessing());
/* Time to go home. */
esbDetachFromBus();
```

In the above example, the developed service uses the esbReceiveMessage( ) function to wait on messages from other services. Once a message is received, the service must retrieve the argument-value pairs that represent the message. The present embodiment of the invention provides a function to retrieve the next argument-value pair from the message without the service having to know ahead of time which argument-value pair is available. The function, esbGetNextArg( ), retrieves the next argument-value pair and indicates not only the type, length, and value of the argument but also the argument name. A service will loop on the function esbGetNextArg( ) while processing the individual values. The following loop is an example:

```
while (esbGetNextArg( msgId, namep, typep, argValue, lenp) !=
ESB_NO_MORE_ARGS)
{ if (!strcmp( namep, "operation"))
opCode = argValue.val.intVal;
else
if (!strcmp( namep, "queue"))
queueType = argValue.val.byteVal; }
```

The above loop indicates that the recipient is only interested in the argument-value pairs with the argument names of "operation" and "queue". All other argument-value pairs are discarded. Realize that once a pair is discarded, they cannot be retrieved again so it is important to anticipate a argument-value pair (although it is not important to anticipate the order of the argument pairs). The argvalue parameter in the above example is a pointer to a special structure that contains a union of all supported data types as defined in the system schema and service library.

All services provided by the present embodiment of the invention communicate via messages. A developer will typically construct a message that is known to be acceptable to a service and then send that message to the service. In a number of cases, the system provides a function interface to services in which the functions are responsible for constructing messages and sending the messages to a service. For example, the present invention provides a service called the Directory Service which provides information about objects under the control of the system. The Directory Service is a software service which knows how to communicate with the data store that ultimately stores the object information (for example, a Sybase database). Since the Directory Service will be one of the most common services used by a developer, the present invention provides function interfaces to the Directory Service. The function interfaces are responsible for taking a request and constructing proper messages and arguments to communicate with the Directory Service. This alleviates some of the development tedium in communicating with commonly used services.

From the foregoing, it should be appreciated that the present invention thus provides a method and architecture for the creation, control and deployment services within a computing environment. The method and architecture allows adaptive communication between services via the associated agents to accomplish specified tasks. The adaptive communication between services is accomplished through commonly utilized Messaging facilities within each service coupled with message manipulation capabilities within the agents associated with each service. While the invention herein disclosed has been described by means of specific embodiments and processes, numerous modifications and variations can be made thereto by those skilled in the art without departing from the scope of the invention as set forth in the claims or sacrificing all its material advantages.

What is claimed is:

1. A distributed computing system comprising:

a plurality of computer hosts;

a communication network for exchanging information and data between said computer hosts;

a plurality of services associated with said computer hosts, each of said services adapted to perform a prescribed function in response to the receipt of an electronic message, said plurality of services further adapted to cooperatively perform one or more tasks; and a plurality of agents executing on said computers, wherein each of said services are operatively associated with one or more of said agents and said agents are adapted to control said associated services by manipulating said electronic messages directed to and originating from said associated service;

wherein said services cooperatively perform said tasks by exchanging said electronic messages across said communication network via associated agents.

2. The distributed computing system of claim 1 further comprising a repository data store for identifying said agents, said services, said computer hosts, and the associations therebetween.

3. The distributed computing system of claim 1 wherein each host includes a configuration data store for maintaining information about the configuration of the distributed computing system as it relates to said computer host.

4. The distributed computing system of claim 1 further comprising one or more devices adapted for providing a service, said devices connected to the communication network and adapted to exchange information and data throughout said distributed computing system.

5. The distributed computing system of claim 1 wherein said services include software-based services executing on said computer hosts and said distributed computing system further comprises an agent library for providing selected facilities for said software-based services executing on said computer hosts.

6. The distributed computing system of claim 1 wherein said agents include:

host agents operatively executing on each of said computer hosts; and service agents operatively associated with one more of said services and further operating under the control of one of said host agents;

wherein said host agents exercise control of said associated service agents by further manipulating said electronic messages passing through said service agents.

7. The distributed computing system of claim 6 wherein one of said host agents and one of said associated service agents are executing on separate computer hosts.

8. The distributed computing system of claim 6 wherein one of said host agents and one of said associated service agents are executing on the same computer host.

9. The distributed computing system of claim 6 wherein one of said host agents is associated with more than one of said service agents.

10. The distributed computing system of claim 6 wherein one of said host agents and one or more of said associated service agents are embedded within a software-based service.

11. The distributed computing system of claim 1 wherein one of said agents is associated with more than one of said services.

12. The distributed computing system of claim 1 wherein one of said services is associated with more than one of said agents.

13. The distributed computing system of claim 1 further comprising one or more partitions, each partition including:

a plurality of services associated with said computer hosts; and a plurality of agents operatively associated with one or more of said services included within said entity, said agents adapted to control said associated services by manipulating said electronic messages directed to and originating from said associated service.

14. The distributed computing system of claim 1 wherein each of said agents further include:

an identification element for identifying said agent;

a means for associating said agent with one or more services; and one or more auxiliary elements for defining a behavior of said agent with respect to each associated service;

wherein said auxiliary elements govern the manipulation of messages directed to and originating from said associated service.

15. The distributed computing system of claim 14 wherein each of said agents further includes a queue which provides queuing information for said agent.

16. The distributed computing system of claim 1 wherein each of said services further include:

a first identification element for identifying said service;

a second identification element for identifying a type of service embodied by said service;

a means for associating said service with one or more agents; and a means for receiving and sending electronic messages via said associated agents; and a means to perform said prescribed function in response to the receipt of said electronic message.

17. The distributed computing system of claim 1 wherein said plurality of services includes a transaction service for governing transactions within the distributed computing system, said transaction service comprises:

means for identifying concurrency behavior;

means for identifying transaction behavior;

means for ensuring accurate semantics are utilized during transactions; and means for defining the scope of the transactions, wherein said services are able to define the scope of the work to be performed.

18. The distributed computing system of claim 1 wherein said plurality of services includes a queue service for handling messages sent to a destination agent and associated service, said queue service comprises:

means for storing messages sent to said destination agent until said destination agent retrieves said messages; and means for forwarding messages when said destination agent and associated service are unavailable to retrieve messages.

19. The distributed computing system of claim 1 wherein said plurality of services includes an identity service for uniquely identifying objects throughout the distributed computing system such that said objects can be located.

20. The distributed computing system of claim 1 wherein said plurality of services includes an event service comprising:

means for defining an event within the distributed computing system; and means for subscribing objects to defined events such that said objects react to certain events in a prescribed manner.

21. The distributed computing system of claim 1 wherein said plurality of services includes a workflow service, said workflow service comprises:

means for defining a process flow, said process flows including one or more activities operating on one or more work items; and means for initiating a process flow;

wherein said workflow service facilitates the performance of prescribed tasks in a prescribed sequence.

22. The distributed computing system of claim 1 wherein said plurality of services includes a directory service adapted to retrieve information about defined objects contained within the distributed computing system.

23. An agent for controlling services in a service-based distributed computing environment, each service is adapted for performing a prescribed function, said services are further adapted to cooperatively perform various tasks by sending and receiving electronic messages, said agent comprising:

an identification element for uniquely identifying said agent across said distributed computing environment;

a means for associating said agent with one or more services; and one or more auxiliary elements for defining a behavior of said agent with respect to each associated service;

wherein said agents are adapted to control the execution and operation of said associated service in accordance with said defined behavior through the manipulation of messages directed to and originating from said associated service.

24. The agent for controlling services in a service-based distributed computing environment of claim 23 wherein said auxiliary elements further include a queue which provides queuing information for said agent.

25. The agent for controlling services in a service-based distributed computing environment of claim 23 wherein said auxiliary elements further include a schedule element which identifies scheduling constraints of said associated service.

26. The agent for controlling services in a service-based distributed computing environment of claim 23 wherein said auxiliary elements further include a security element which provides security and access constraints of said agent and associated service.

27. The agent for controlling services in a service-based distributed computing environment of claim 23 wherein said auxiliary elements further include a scripting which provides script information for an agent which represents a general mechanism for programing the behavior of said agent and said associated service.

28. The agent for controlling services in a service-based distributed computing environment of claim 23 wherein said auxiliary elements further includes a rule element which provides rule information for an agent thereby allowing an agent to derive behavior based on the contents of an electronic message.

29. The agent for controlling services in a service-based distributed computing environment of claim 23 wherein said auxiliary elements further includes a behavior element which defines general behaviors associated with said agent and said associated service.

30. A distributed computing system comprising:

a communication network;

a plurality of computer hosts adapted for exchanging information and data across said communication network;

wherein each computer host includes a computer readable memory configured with specific physical properties that represent one or more computer application-based services, each of said services adapted to perform a prescribed function in response to the receipt of an electronic message, said services further adapted to cooperatively perform one or more tasks; and wherein each of said computer readable memory is further configured with specific physical properties that represent one or more agents operatively associated with said services such that said agents are adapted to control said associated services by manipulating said electronic messages directed to and originating from said associated service;

wherein said services cooperatively perform said tasks by exchanging said electronic messages across said communication network via associated agents.

* * * * *